United States Patent
Liao et al.

(10) Patent No.: US 12,253,656 B2
(45) Date of Patent: *Mar. 18, 2025

(54) LIGHT-FOLDING ELEMENT FOR CAMERA MODULE, CAMERA MODULE AND ELECTRONIC DEVICE

(71) Applicant: LARGAN PRECISION CO., LTD., Taichung (TW)

(72) Inventors: Min-Chun Liao, Taichung (TW); Lin An Chang, Taichung (TW); Ming-Ta Chou, Taichung (TW); Jyun-Jia Cheng, Taichung (TW); Cheng-Feng Lin, Taichung (TW); Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,314

(22) Filed: Nov. 22, 2023

(65) Prior Publication Data

US 2024/0085676 A1   Mar. 14, 2024

Related U.S. Application Data

(63) Continuation of application No. 17/359,168, filed on Jun. 25, 2021, now Pat. No. 11,867,887.
(Continued)

(51) Int. Cl.
*G02B 13/00* (2006.01)
*G02B 5/22* (2006.01)
(Continued)

(52) U.S. Cl.
CPC .......... *G02B 13/0065* (2013.01); *G02B 5/22* (2013.01); *G02B 23/08* (2013.01); *G03B 17/17* (2013.01)

(58) Field of Classification Search
CPC ... G02B 13/0065; G02B 13/007; G03B 17/17
See application file for complete search history.

(56) References Cited

U.S. PATENT DOCUMENTS

| 4,989,960 A | 2/1991 | Thomas |
| 5,253,005 A | 10/1993 | Koyama et al. |

(Continued)

FOREIGN PATENT DOCUMENTS

| CN | 202093232 U | 12/2011 |
| CN | 111308643 A | 6/2020 |

(Continued)

OTHER PUBLICATIONS

CN Office Action dated Apr. 1, 2023 as received in Application No. 202110355343.X.

*Primary Examiner* — Cara E Rakowski
(74) *Attorney, Agent, or Firm* — Maschoff Brennan

(57) ABSTRACT

A light-folding element includes an object-side surface, an image-side surface, a reflection surface and a connection surface. The reflection surface is configured to reflect imaging light passing through the object-side surface to the image-side surface. The connection surface is connected to the object-side, image-side and reflection surfaces. The light-folding element has a recessed structure located at the connection surface. The recessed structure is recessed from the connection surface an includes a top end portion, a bottom end portion and a tapered portion located between the top end and bottom end portions. The top end portion is located at an edge of the connection surface. The tapered portion has two tapered edges located on the connection surface. The tapered edges are connected to the top end and bottom end portions. A width of the tapered portion decreases in a direction from the top end portion towards the bottom end portion.

15 Claims, 24 Drawing Sheets

Related U.S. Application Data

(60) Provisional application No. 63/130,140, filed on Dec. 23, 2020.

(51) Int. Cl.
*G02B 23/08* (2006.01)
*G03B 17/17* (2021.01)

(56) References Cited

U.S. PATENT DOCUMENTS

| | | |
|---|---|---|
| 5,777,674 A | 7/1998 | Ohmuro |
| 6,285,515 B1 | 9/2001 | Kitazawa et al. |
| 9,952,359 B2 | 4/2018 | Chang |
| 10,133,037 B2 | 11/2018 | Chou |
| 10,663,697 B2 | 5/2020 | Chou |
| 2001/0013974 A1 | 8/2001 | Araki et al. |
| 2005/0207038 A1 | 9/2005 | Inamoto |
| 2006/0017834 A1 | 1/2006 | Konno et al. |
| 2015/0260988 A1* | 9/2015 | Sugihara ............ G02B 27/0172 359/833 |
| 2020/0064527 A1 | 2/2020 | Shigemitsu et al. |
| 2022/0163706 A1* | 5/2022 | Feldman ............ G02B 13/0065 |
| 2022/0196993 A1 | 6/2022 | Liao et al. |
| 2022/0294945 A1 | 9/2022 | Zhao et al. |

FOREIGN PATENT DOCUMENTS

| | | |
|---|---|---|
| CN | 214409431 U | 10/2021 |
| JP | H11-95106 A | 4/1999 |
| JP | 2000-227554 A | 8/2000 |
| JP | 2005-173006 A | 6/2005 |
| JP | 2016-071276 A | 5/2016 |

* cited by examiner

LIGHT-FOLDING ELEMENT FOR CAMERA MODULE, CAMERA MODULE AND ELECTRONIC DEVICE

RELATED APPLICATIONS

This application is a continuation patent application of U.S. application Ser. No. 17/359,168, filed on Jun. 25, 2021, which claims priority to U.S. Provisional Application 63/130,140, filed on Dec. 23, 2020, which is incorporated by reference herein in its entirety.

BACKGROUND

Technical Field

The present disclosure relates to a light-folding element, a camera module and an electronic device, more particularly to a light-folding element for a camera module and a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring compact size, but conventional optical systems, especially the telephoto optical systems with a long focal length, are difficult to meet both the requirements of high image quality and compactness. Conventional telephoto optical systems usually have shortcomings of overly long total length, poor image quality or overly large in size, thereby unable to meet the requirements of the current technology trends. To achieve compactness, the optical systems may be configured to have a folded optical axis so as to reduce the dimension of the optical systems in a specific direction, thereby reducing the total system size. However, the stray light generated inside the optical systems at the diffraction limit thereof has a significant impact on the imaging quality, which limits the resolution of the optical systems. Moreover, in manufacturing light-folding elements by injection molding process, a conventional light-folding element can easily stick in the mold due to its shape, which is unfavorable for ejection of molded elements and may cause the optical surfaces of the light-folding element formed uneven, and the manufacturing yield rate and efficiency would thus decrease.

Accordingly, how to improve the optical systems for achieving a compact size, blocking stray light and increasing the feasibility of ejection of injection molded light-folding element so as to meet the requirement of high-end-specification electronic devices is an important topic in this field nowadays.

SUMMARY

According to one aspect of the present disclosure, a light-folding element for a camera module includes an object-side surface, an image-side surface, at least one reflection surface and at least one connection surface. An imaging light travelling into the camera module enters the object-side surface and exits through the image-side surface. The reflection surface is configured to reflect the imaging light passing through the object-side surface and send the imaging light to the image-side surface. The connection surface is connected to the object-side surface, the image-side surface and the reflection surface. The light-folding element has at least one recessed structure located at the connection surface, and the recessed structure is recessed from the connection surface towards an interior of the light-folding element. The recessed structure includes a top end portion, a bottom end portion and a tapered portion at the connection surface. The top end portion is located at an edge of the connection surface. The bottom end portion is located opposite to the top end portion. The tapered portion is connected to and located between the top end portion and the bottom end portion. The tapered portion has two tapered edges located on the connection surface. The two tapered edges are connected to the top end portion and the bottom end portion, and a width of the tapered portion decreases in a direction from the top end portion towards the bottom end portion.

According to another aspect of the present disclosure, a camera module includes an imaging lens system, the aforementioned light-folding element and an image sensor. The light-folding element is located on object side or an image side of the imaging lens system. The image sensor is disposed on an image surface of the imaging lens system, and the image sensor is configured to receive the imaging light and convert the imaging light into electrical signals.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
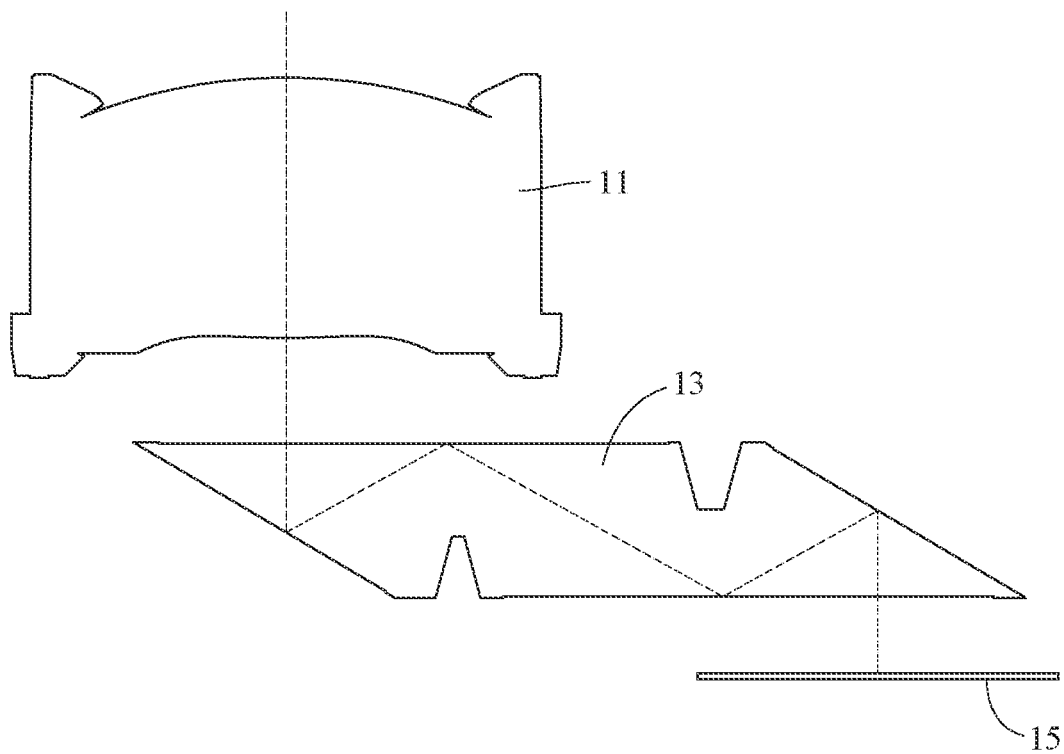
FIG. 1 is a schematic view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a light-folding element for a camera module. The light-folding element includes an object-side surface, an image-side surface, at least one reflection surface and at least one connection surface. An imaging light travelling into the camera module passes through the object-side surface and the image-side surface; more specifically, the imaging light enters into the light-folding element via the object-side surface, and exits from the light-folding element via the image-side surface. The imaging lens system of the camera module focuses the imaging light on an image surface of the camera module. Moreover, the imaging light may pass through the imaging lens system and then the light-folding element in the camera module, or the imaging light may pass through the light-folding element and then the imaging lens system in the camera module, and the present disclosure is not limited thereto. Moreover, the light-folding element can be made of plastic material.

The reflection surface is configured to reflect the imaging light coming from the object-side surface and send the reflected imaging light to the image-side surface. The connection surface is connected to the object-side surface, the image-side surface and the reflection surface. Moreover, the reflection surface may reflect the imaging light by a high reflective film layer thereof, or the reflection surface may reflect the imaging light in a total internal reflection manner, and the present disclosure is not limited thereto.

The light-folding element has at least one recessed structure located at the connection surface, and the recessed structure is recessed from the connection surface towards an interior of the light-folding element. The recessed structure includes a top end portion, a bottom end portion and a tapered portion at the connection surface. The top end portion is located at an edge of the connection surface. The bottom end portion is located opposite to the top end portion. The tapered portion is connected to and located between the top end portion and the bottom end portion. The tapered portion has two tapered edges located on the connection surface. The two tapered edges are connected to the top end portion and the bottom end portion, and a width of the tapered portion decreases in a direction from the top end portion towards the bottom end portion. Moreover, a projection of the recessed structure on a plane where the connection surface is located can be in a shape of a trapezoid or a triangle, and the present disclosure is not limited thereto. The edge of the connection surface can be a junction of the connection surface and the object-side surface, the image-side surface or the reflection surface.

According to the present disclosure, the recessed structure of the light-folding element is favorable for the feasibility of ejection of the light-folding element in an injection molding process, and the recessed structure being recessed from the connection surface is favorable for improving yield rate and increasing the flatness of optical surfaces such as the object-side surface, the image-side surface and the reflection surface. In addition, the configuration of the recessed structure is also favorable for blocking stray light in the light-folding element.

When a width of the top end portion of the recessed structure is Wt, and a width of the bottom end portion of the recessed structure is Wb, the following condition can be satisfied: $0 \leq Wb/Wt < 1$. Therefore, it is favorable for improving ejection efficiency and increasing mass production. Moreover, when the shape of the recessed structure is triangular, the width of the bottom end portion is 0; that is, Wb=0. Please refer to FIG. 7, which shows a schematic view of Wt and Wb according to the 1st embodiment of the present disclosure.

When an angle between the two tapered edges of the tapered portion is α, the following condition can be satisfied: $2 \text{ degrees} \leq \alpha \leq 150 \text{ degrees}$. Therefore, it is favorable for providing a required draft angle when molded elements are released from the mold so as to prevent the molded elements from sticking in the mold. Please refer to FIG. 7, which shows a schematic view of a according to the 1st embodiment of the present disclosure.

The light-folding element can have a light absorption layer, and at least a part of the light absorption layer is disposed on the recessed structure. Therefore, it is favorable for effectively blocking stray light. Moreover, the light absorption layer is made of opaque material having a certain optical density, and the light absorption layer can be disposed on the surface of the light-folding element via optical fiber coating, ink coating or photolithography. Specifically, the light absorption layer can be a blackened coating layer, a black ink coating layer or a photoresist layer, but the present disclosure is not limited thereto. Additionally, the photoresist layer can be positive or negative photoresist type of various manufacturing processes according to actual design requirements.

The recessed structure can have two inclined surfaces respectively extending close to each other from the two tapered edges towards the interior of the light-folding element. Therefore, it is favorable for the light absorption layer to be disposed on the recessed structure so as to increase the uniformity of the light absorption layer covering onto the recessed structure.

The light absorption layer can surround at least one of the object-side surface, the image-side surface and the at least one reflection surface. Therefore, it is favorable for reducing the possibility of generating non-imaging light at the periphery of optical surfaces.

The number of the at least one connection surface can be two, and the two connection surfaces are disposed opposite to each other. In addition, the number of the at least one recessed structure can be two, and the two recessed structures are respectively located at the two connection surfaces. That is, the light-folding element can include two connection surfaces respectively located on two sides of the object-side surface, the image-side surface and the reflection surface, and each of the two connection surfaces has one recessed structure thereon. Therefore, having the recessed structures symmetrically disposed is favorable for providing even ejection force so as to maintain the optical quality of the light-folding element.

The two recessed structures can be connected to each other, and a groove is formed between the two recessed structures. Therefore, it is favorable for increasing the mechanical strength of the light-folding element and reducing the weight of the light-folding element.

When a depth of the groove is Dg, and a distance between the top end portion and the bottom end portion of each of the recessed structures is D, the following condition can be satisfied: $Dg/D \leq 1$. Therefore, the groove is favorable for maintaining high manufacturing yield rate. Please refer to FIG. 7, which shows a schematic view of Dg and D according to the 1st embodiment of the present disclosure.

The groove can be located between two of the object-side surface, the image-side surface and the at least one reflection surface. Therefore, it is favorable for reducing residual stress in the light-folding element while maintain high image quality. Moreover, the number of the at least one recessed structure of the light-folding element can be plural, and the groove can be located between two of the reflection surfaces.

The number of the at least one recessed structure can be two, and the two recessed structures are both located at one of the connection surfaces and disposed opposite to each other. In addition, the two top end portions of the two recessed structures are respectively located at two opposite edges of the connection surface. Therefore, it is favorable for reducing manufacturing tolerance so as to achieve higher dimensional accuracy.

The two tapered portions of the two recessed structures can taper in opposite directions. Therefore, it is favorable for the feasibility of upper and lower parts of the mold being effectively removed during ejection of the molded light-folding element; furthermore, it is favorable for reducing the structural complexity of the mold so as to reduce manufacturing cost.

The two tapered portions of the two recessed structures can be connected to each other. Therefore, it is favorable for ensuring the structural integrity of the recessed structures so as to reduce the possibility of shrinkage and deformation of molded light-folding element.

The number of the at least one reflection surface can be at least two. Therefore, it is favorable for designing a desired optical path arrangement according to actual optical and mechanical requirements so as to achieve compactness. Please refer to FIG. 1 and FIG. 5, which show schematic views of a camera module according to the 1st embodiment of the present disclosure. In the 1st embodiment, the light-folding element 13 includes four reflection surfaces 133a, 133b, 133c and 133d, the object-side surface 131 and the reflection surface 133b are coplanar, and the image-side surface 132 and the reflection surface 133c are coplanar.

The light-folding element can be formed by injection molding process, the light-folding element has at least one gate trace located at the connection surface. Therefore, it is favorable for the feasibility of manufacturing plastic light-folding element.

The present disclosure provides a camera module which include an imaging lens system, the aforementioned light-folding element and an image sensor. The light-folding element is located on an object side or image side of the imaging lens system. The image sensor is disposed on an image surface of the imaging lens system, and the image sensor is configured to receive the imaging light and convert the imaging light into electrical signals. Such configuration is favorable for a telephoto camera module, which can meet the requirement of compact camera module and maintain high image quality.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
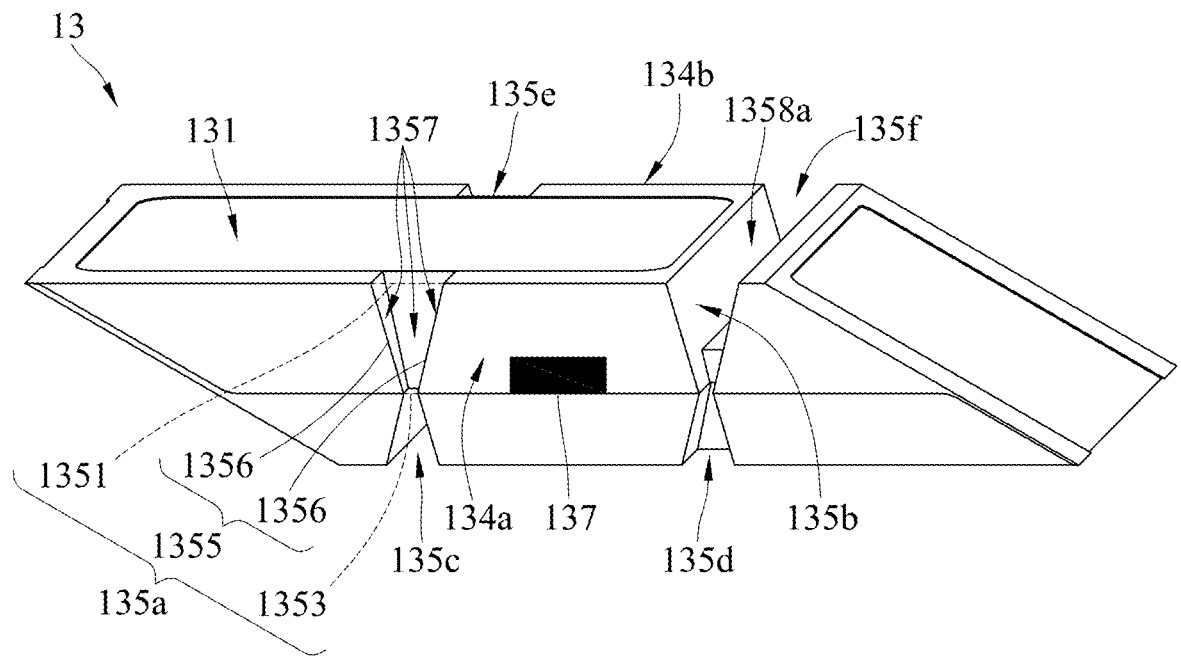
FIG. 2 is a perspective view of a light-folding element of the camera module in FIG. 1.
Figure 3:
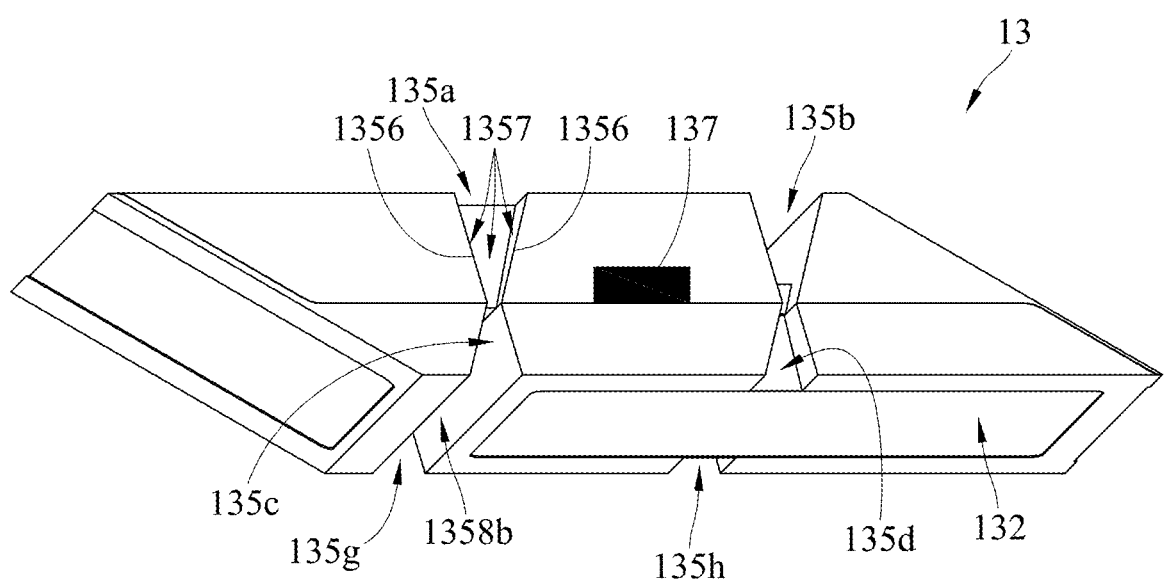
FIG. 3 is another perspective view of the light-folding element of the camera module in FIG. 1.
Figure 4:
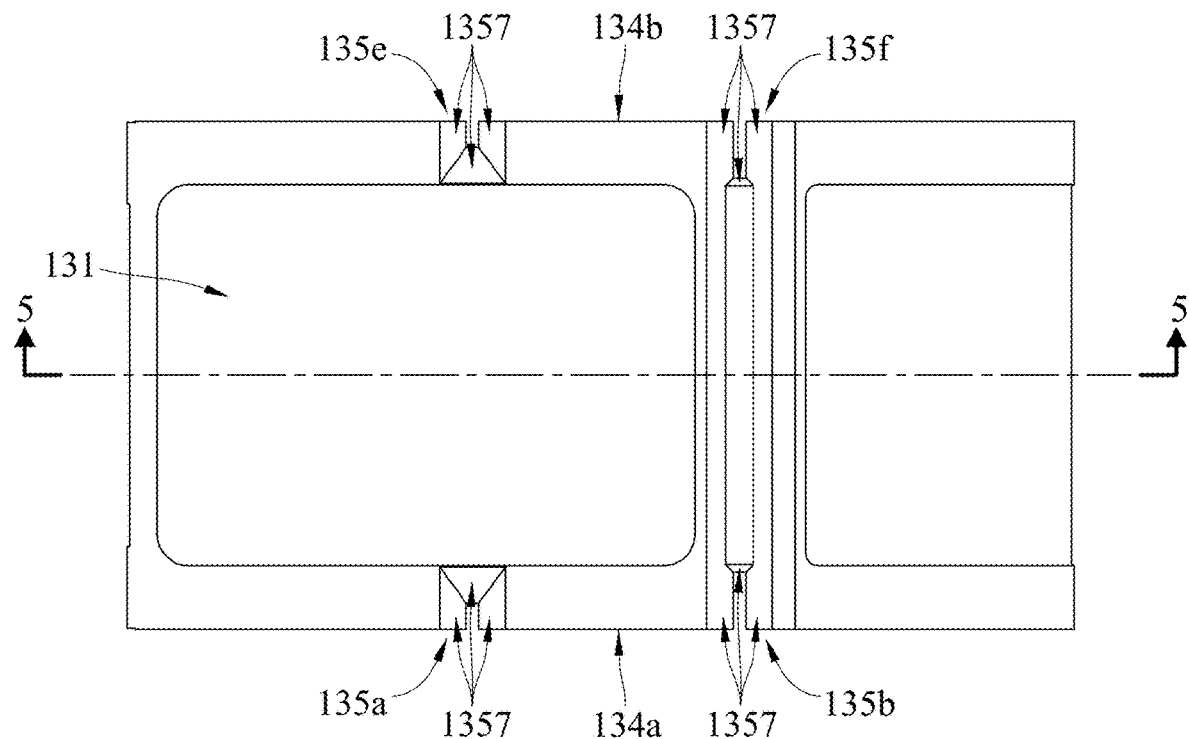
FIG. 4 is a front view of the light-folding element of the camera module in FIG. 1.
Figure 5:
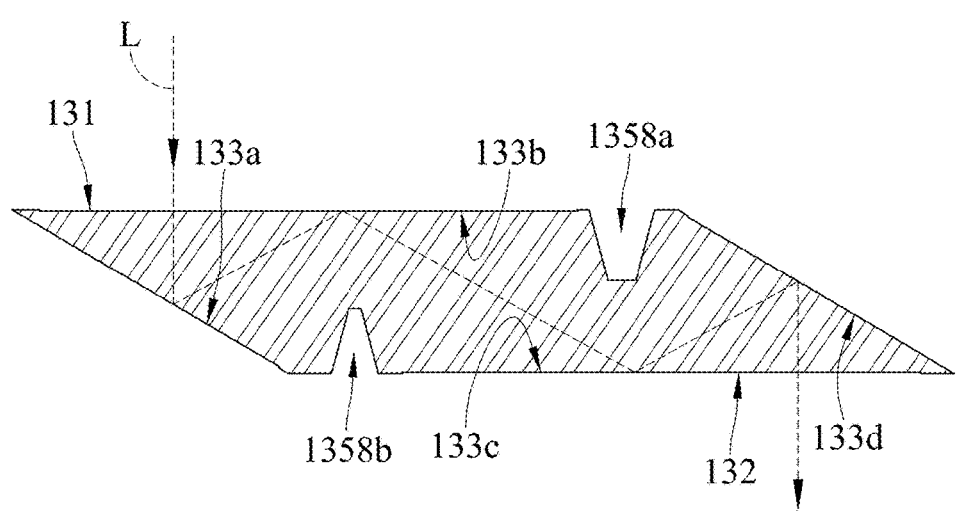
FIG. 5 is a cross-sectional view of the light-folding element along line 5-5 in FIG. 4.
Figure 6:
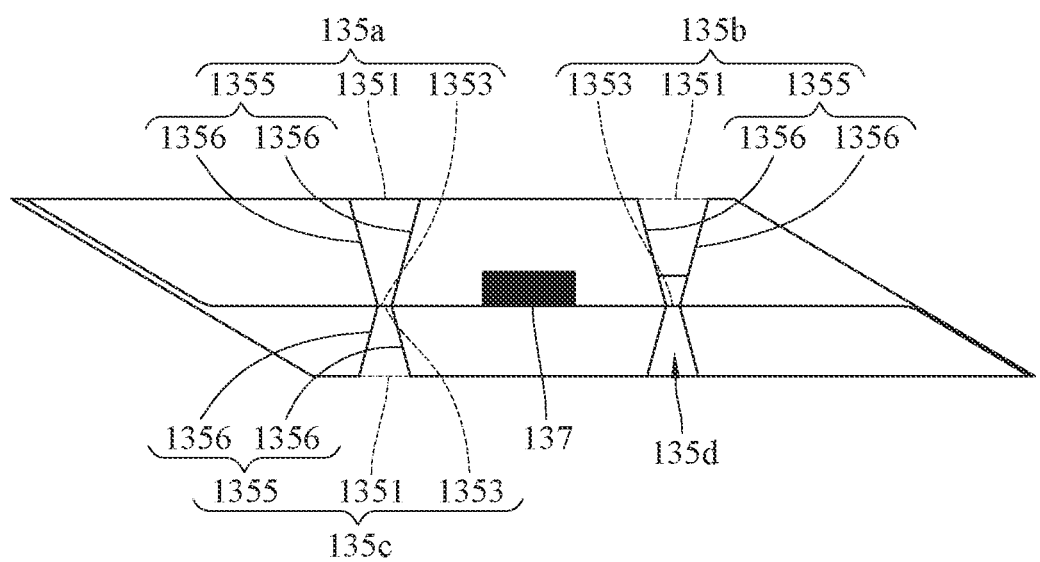
FIG. 6 is a top view of the light-folding element of the camera module in FIG. 1.
Figure 7:
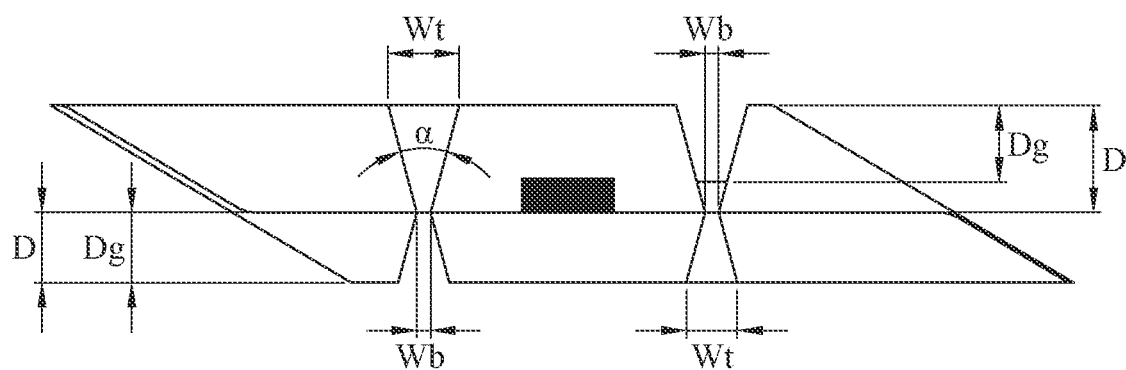
FIG. 7 shows a schematic view of Wt, Wb, α, Dg and D according to the 1st embodiment of the present disclosure.
Figure 8:
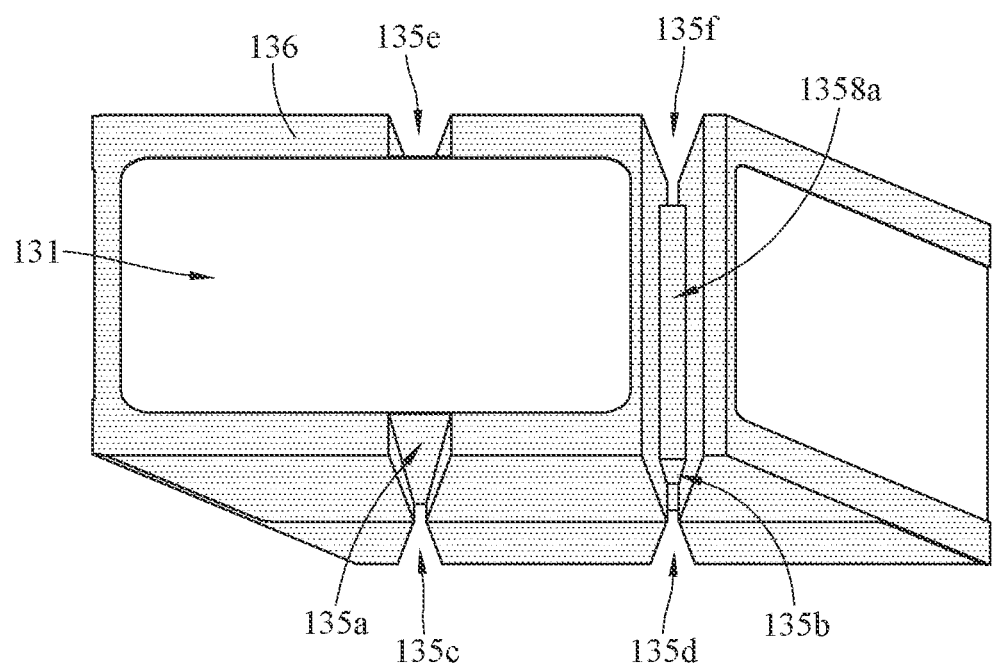
FIG. 8 is a schematic view of a light absorption layer of the light-folding element of the camera module in FIG. 1.
Figure 9:
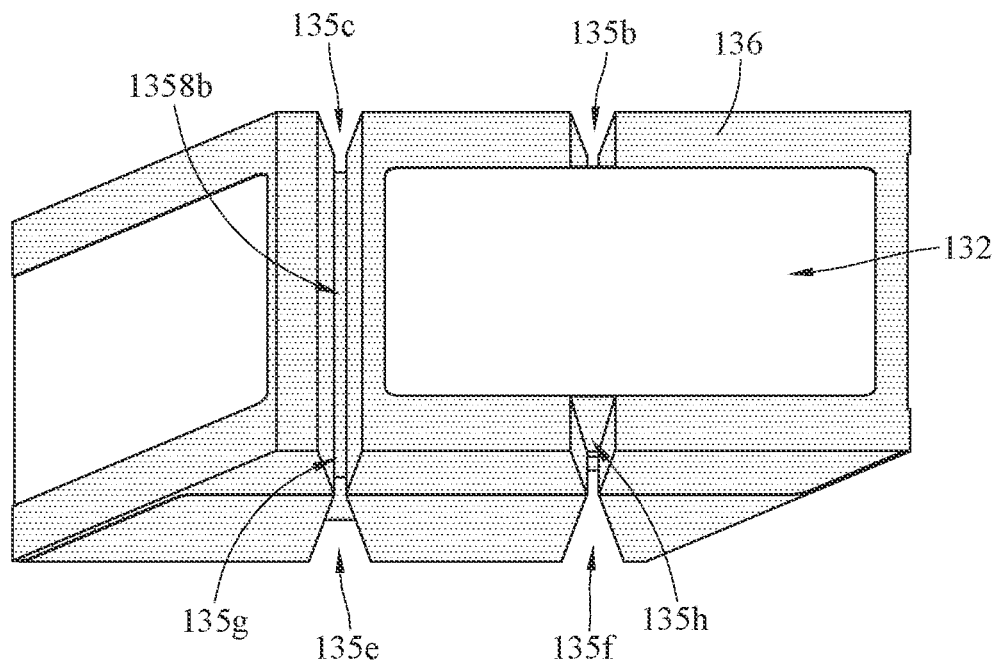
FIG. 9 is another schematic view of the light absorption layer of the light-folding element of the camera module in FIG. 1.

Please refer to FIG. 1 to FIG. 9. FIG. 1 is a schematic view of a camera module according to the 1st embodiment of the present disclosure, FIG. 2 is a perspective view of a light-folding element of the camera module in FIG. 1, FIG. 3 is another perspective view of the light-folding element of the camera module in FIG. 1, FIG. 4 is a front view of the light-folding element of the camera module in FIG. 1, FIG. 5 is a cross-sectional view of the light-folding element along line 5-5 in FIG. 4, FIG. 6 is a top view of the light-folding element of the camera module in FIG. 1, FIG. 7 shows a schematic view of Wt, Wb, a, Dg and D according to the 1st embodiment of the present disclosure, FIG. 8 is a schematic view of a light absorption layer of the light-folding element of the camera module in FIG. 1, and FIG. 9 is another schematic view of the light absorption layer of the light-folding element of the camera module in FIG. 1.

In this embodiment, a camera module 10 is provided. The camera module 10 includes an imaging lens system 11, a light-folding element 13 and an image sensor 15. The light-folding element 13 is located on an image side of the imaging lens system 11. The image sensor 15 is disposed on an image surface of the imaging lens system 11, and the image sensor 15 is configured to receive an imaging light L and convert the imaging light L into electrical signals.

The light-folding element 13 includes an object-side surface 131, an image-side surface 132, four reflection surfaces 133a, 133b, 133c and 133d and two connection surfaces 134a and 134b. The imaging light L travelling into the camera module 10 enters the object-side surface 131 and exits through the image-side surface 132. The imaging lens system 11 focuses the imaging light L on the image surface. In this embodiment, the imaging light L passes through the imaging lens system 11 and then passes through the light-folding element 13.

The reflection surfaces 133a, 133b, 133c and 133d are configured to reflect the imaging light L coming from the object-side surface 131 and send the imaging light L to the image-side surface 132. In addition, the imaging light L passes through, in sequence, the object-side surface 131, the reflection surface 133a, the reflection surface 133b, reflection surface 133c, the reflection surface 133d and the image-side surface 132. Moreover, the reflection surface 133b and the object-side surface 131 are coplanar and face towards opposite directions, and the reflection surface 133c and the image-side surface 132 are coplanar and face towards opposite directions.

The connection surfaces 134a and 134b are connected to the object-side surface 131, the image-side surface 132 and the reflection surfaces 133a, 133b, 133c and 133d. In addition, the connection surfaces 134a and 134b are disposed opposite to each other; in specific, the connection surfaces 134a and 134b are respectively located on two sides of the object-side surface 131, the image-side surface 132 and reflection surfaces 133a, 133b, 133c and 133d.

The light-folding element 13 has eight recessed structures 135a, 135b, 135c, 135d, 135e, 135f, 135g and 135h. The four recessed structures 135a, 135b, 135c and 135d are located at the connection surface 134a, and the four recessed structures 135e, 135f, 135g and 135h are located at the connection surface 134b. Each of the recessed structures 135a, 135b, 135c, 135d, 135e, 135f, 135g and 135h is recessed from the connection surface 134a or the connection surface 134b towards an interior of the light-folding element 13. In this embodiment, a projection of each of the recessed structures 135a, 135b, 135c and 135d on a plane where the connection surface 134a is located is in a shape of a trapezoid, and a projection of each of recessed structures 135e, 135f, 135g and 135h on a plane where the connection surface 134b is located is in a shape of a trapezoid.

Each of the recessed structures 135a, 135b, 135c and 135d includes a top end portion 1351, a bottom end portion 1353 and a tapered portion 1355 at the connection surface 134a, and each of the recessed structures 135e, 135f, 135g and 135h includes a top end portion 1351, a bottom end portion 1353 and a tapered portion 1355 at the connection surface 134b. The top end portions 1351 are respectively located at an edge of the connection surface 134a or the connection surface 134b. In each recessed structure 135a, 135b, 135c, 135d, 135e, 135f, 135g or 135h, the bottom end portion 1353 is located opposite to the top end portion 1351, and the tapered portion 1355 is connected to and located between the top end portion 1351 and the bottom end portion 1353. Moreover, the tapered portion 1355 has two tapered edges 1356 located on the connection surface 134a or the connection surface 134b. The two tapered edges 1356 are connected to the top end portion 1351 and the bottom end portion 1353, and a width of the tapered portion 1355 decreases in a direction from the top end portion 1351 towards the bottom end portion 1353. Furthermore, each of the recessed structures 135a, 135b, 135c, 135d, 135e, 135f, 135g and 135h has two or three inclined surfaces 1357, with two of the inclined surfaces 1357 respectively extending from the two tapered edges 1356 towards the interior of the light-folding element 13. The three inclined surfaces 1357 of each of the recessed structures 135a, 135b, 135d, 135e, 135f and 135h respectively extend close to one another from the top end portion 1351 towards the bottom end portion 1353.

The recessed structure 135b and the recessed structure 135f are connected to each other, and a groove 1358a is formed between the recessed structure 135b and the recessed structure 135f. The groove 1358a is located between the reflection surface 133b and the reflection surface 133d. In addition, the recessed structure 135c and the recessed structure 135g are connected to each other, and a groove 1358b is formed between the recessed structure 135c and the recessed structure 135g. The groove 1358b is located between the reflection surface 133a and the reflection surface 133c.

The recessed structure 135a and the recessed structure 135c are disposed opposite to each other, and the tapered portions 1355 of the recessed structures 135a and 135c are connected to each other and taper in opposite directions. The recessed structure 135b and the recessed structure 135d are disposed opposite to each other. The tapered portions 1355 of the recessed structure 135b and the recessed structure 135d are connected to each other and taper in opposite directions. The recessed structure 135e and the recessed structure 135g are disposed opposite to each other. The tapered portions 1355 of the recessed structure 135e and the recessed structure 135g are connected to each other and taper in opposite directions. The recessed structure 135f and the recessed structure 135h are disposed opposite to each other. The tapered portions 1355 of the recessed structure 135f and the recessed structure 135h are connected to each other and taper in opposite directions.

The light-folding element 13 has a light absorption layer 136 on its surface. As shown in FIG. 8 and FIG. 9, at least a part of the light absorption layer 136 is disposed on the recessed structures 135a, 135b, 135c, 135d, 135e, 135f, 135g and 135h, and the light absorption layer 136b surrounds the object-side surface 131, the image-side surface 132 and the reflection surfaces 133a, 133b, 133c and 133d.

In this embodiment, the light-folding element 13 is made of plastic material and formed by injection molding process. The light-folding element 13 has two gate traces 137 respectively located at the connection surfaces 134a and 134b.

When a width of the top end portion 1351 is Wt, and a width of the bottom end portion 1353 is Wb, the following conditions are satisfied for each of the recessed structures 135a, 135b, 135e and 135f: Wt=1.039 mm; Wb=0.2 mm; and Wb/Wt=0.192.

When a width of the top end portion 1351 is Wt, and a width of the bottom end portion 1353 is Wb, the following conditions are satisfied for each of the recessed structures 135c, 135d, 135g, 135h: Wt=0.747 mm; Wb=0.2 mm; and Wb/Wt=0.268.

When an angle between the two tapered edges 1356 of the tapered portion 1355 is α, the following condition is satisfied: α=30 degrees.

When a depth of the groove 1358a is Dg, and a distance between the top end portion 1351 and the bottom end portion 1353 of each of the recessed structures 135b and 135f is D, the following conditions are satisfied: Dg=1.12 mm; D=1.565 mm; and Dg/D=0.716.

When a depth of the groove 1358b is Dg, and a distance between the top end portion 1351 and the bottom end portion 1353 of each of the recessed structures 135c and 135g is D, the following conditions are satisfied: Dg=1.02 mm; D=1.02 mm; and Dg/D=1.

2nd Embodiment

Figure 10:
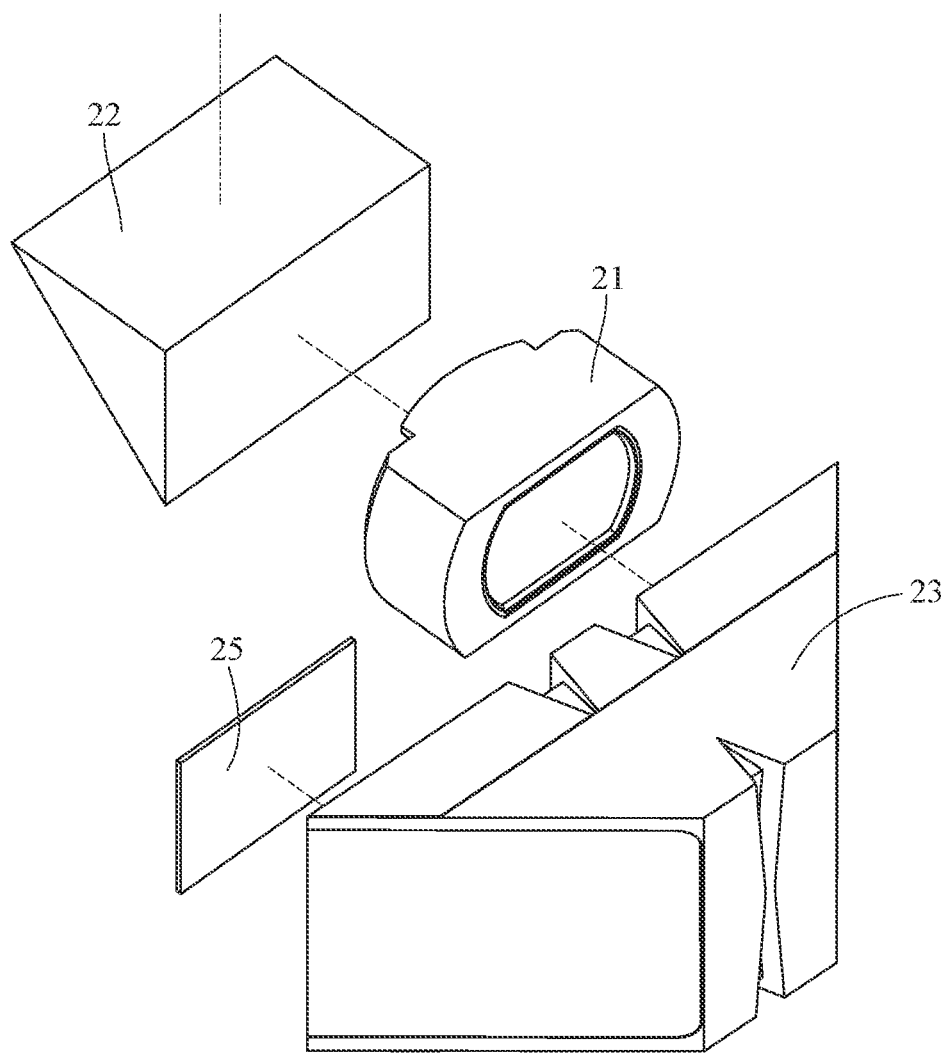
FIG. 10 is a perspective view of a camera module according to the 2nd embodiment of the present disclosure.
Figure 11:
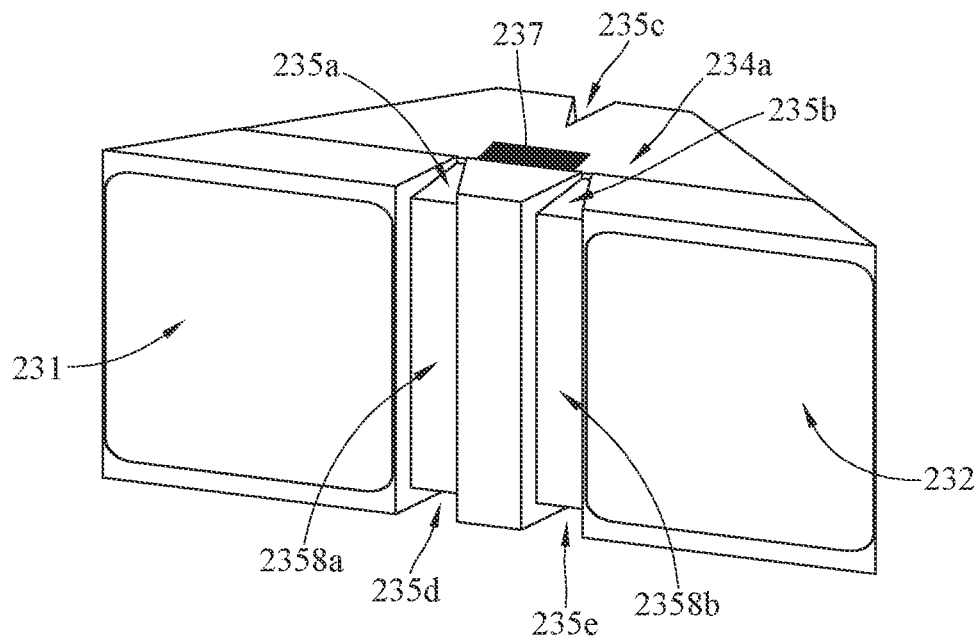
FIG. 11 is a perspective view of a light-folding element of the camera module in FIG. 10.
Figure 12:
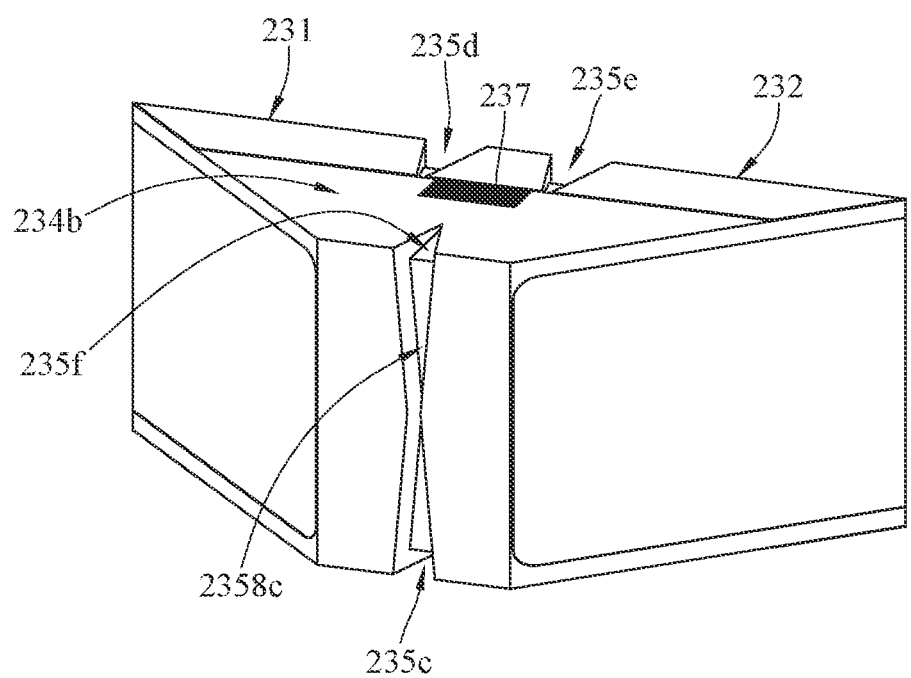
FIG. 12 is another perspective view of the light-folding element of the camera module in FIG. 10.
Figure 13:
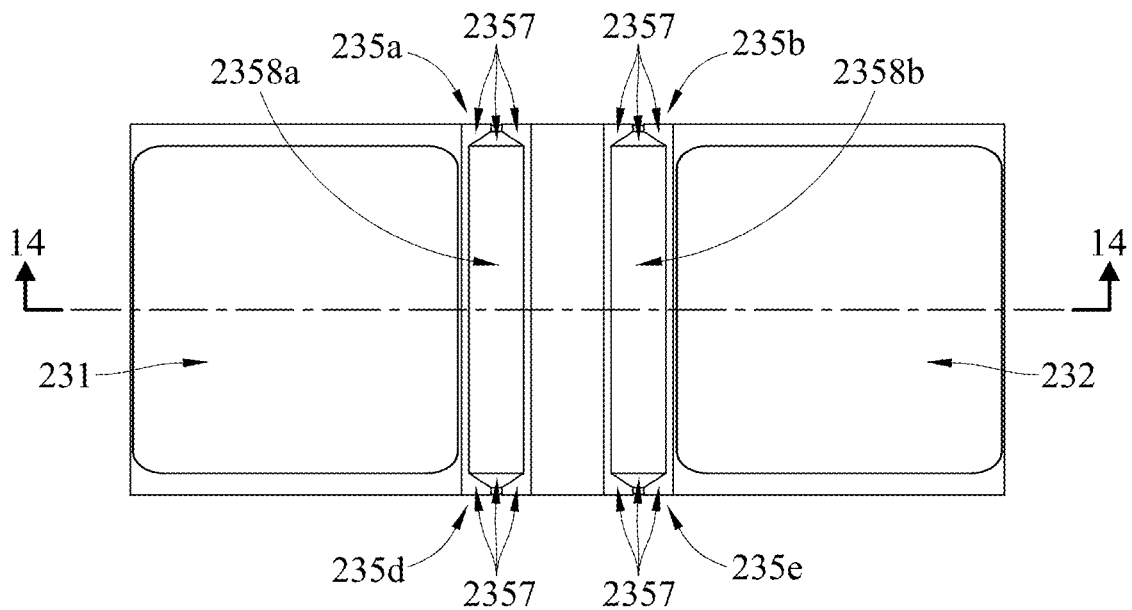
FIG. 13 is a front view of the light-folding element of the camera module in FIG. 10.
Figure 14:
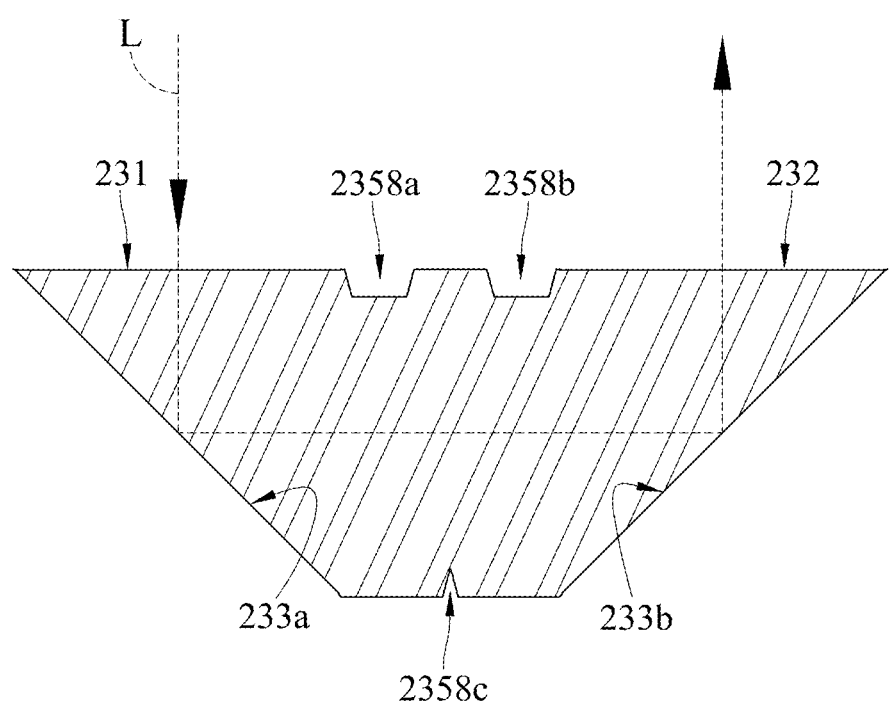
FIG. 14 is a cross-sectional view of the light-folding element along line 14-14 in FIG. 13.
Figure 15:
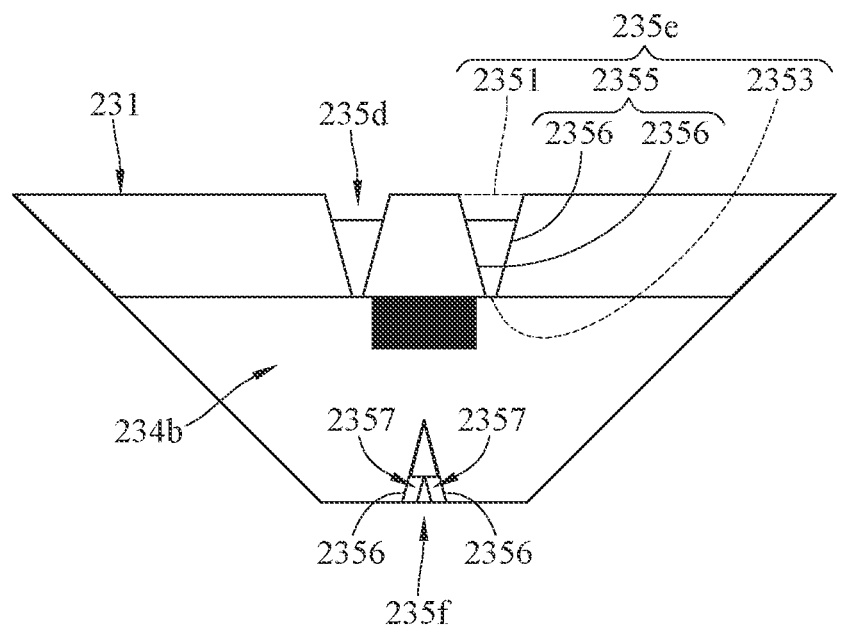
FIG. 15 is a top view of the light-folding element of the camera module in FIG. 10.
Figure 16:
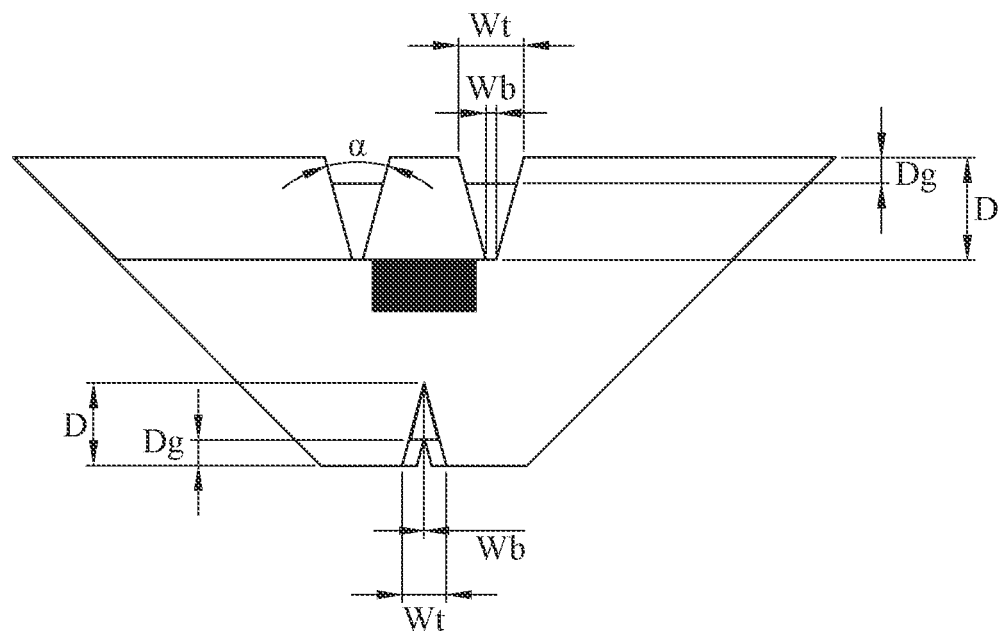
FIG. 16 shows a schematic view of Wt, Wb, a, Dg and D according to the 2nd embodiment of the present disclosure.
Figure 17:
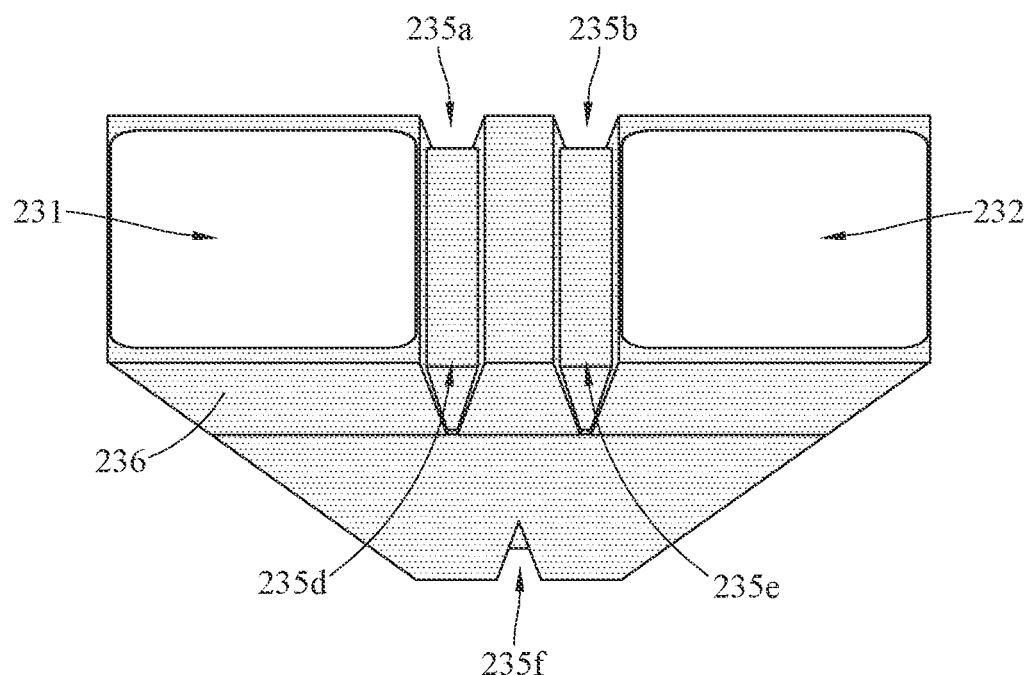
FIG. 17 is a schematic view of a light absorption layer of the light-folding element of the camera module in FIG. 10.
Figure 18:
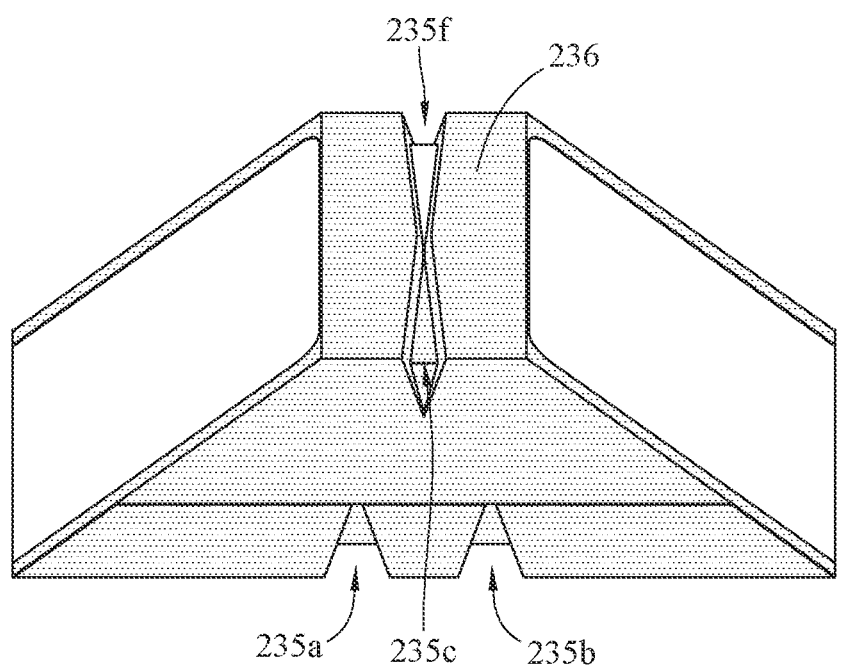
FIG. 18 is another schematic view of the light absorption layer of the light-folding element of the camera module in FIG. 10.

Please refer to FIG. 10 to FIG. 18. FIG. 10 is a perspective view of a camera module according to the 2nd embodiment of the present disclosure, FIG. 11 is a perspective view of a light-folding element of the camera module in FIG. 10, FIG. 12 is another perspective view of the light-folding element of the camera module in FIG. 10, FIG. 13 is a front view of the light-folding element of the camera module in FIG. 10, FIG. 14 is a cross-sectional view of the light-folding element along line 14-14 in FIG. 13, FIG. 15 is a top view of the light-folding element of the camera module in FIG. 10, FIG. 16 shows a schematic view of Wt, Wb, a, Dg and D according to the 2nd embodiment of the present disclosure, FIG. 17 is a schematic view of a light absorption layer of the light-folding element of the camera module in FIG. 10, and FIG. 18 is another schematic view of the light absorption layer of the light-folding element of the camera module in FIG. 10.

In this embodiment, a camera module 20 is provided. The camera module 20 includes a reflecting element 22, an imaging lens system 21, a light-folding element 23 and an image sensor 25. The reflecting element 22 is located on an object side of the imaging lens system 21, the light-folding element 23 is located on an image side of the imaging lens system 21, and the image sensor 25 is disposed on an image surface of the imaging lens system 21. The reflecting element 22 is configured to change the travelling direction of an imaging light L so that the imaging light L can enter the imaging lens system 21, and the image sensor 25 is configured to receive the imaging light L and convert the imaging light L into electrical signals.

The light-folding element 23 includes an object-side surface 231, an image-side surface 232, two reflection surfaces 233a and 233b and two connection surfaces 234a and 234b. The imaging light L travelling into the camera module 20 enters the object-side surface 231 and exits through the image-side surface 232. The imaging lens system 21 focuses the imaging light L on the image surface. In this embodiment, the imaging light L passes through the imaging lens system 21 and then passes through the light-folding element 23.

The reflection surfaces 233a and 233b are configured to reflect the imaging light L coming from the object-side surface 231 and send the imaging light L to the image-side surface 232. In addition, the imaging light L passes through, in sequence, the object-side surface 231, the reflection surface 233a, the reflection surface 233b and the image-side surface 232.

The connection surfaces 234a and 234b are connected to the object-side surface 231, the image-side surface 232 and the two reflection surfaces 233a and 233b. In addition, the connection surfaces 234a and 234b are disposed opposite to each other; in specific, the connection surfaces 234a and 234b are respectively located on two sides of the object-side surface 231, the image-side surface 232 and the two reflection surfaces 233a and 233b.

The light-folding element 23 has six recessed structures 235a, 235b, 235c, 235d, 235e and 235f. The three recessed structures 235a, 235b and 235c are located at the connection surface 234a, and the three recessed structures 235d, 235e and 235f are located at the connection surface 234b. Each of the recessed structures 235a, 235b, 235c, 235d, 235e and 235f is recessed from the connection surface 234a or the connection surface 234b towards an interior of the light-folding element 23. In this embodiment, a projection of each of the recessed structures 235a and 235b on a plane where the connection surface 234a is located is in a shape of a trapezoid, and a projection of each of the recessed structures 235d and 235e on a plane where the connection surface 234b is located is in a shape of a trapezoid. In addition, a projection of the recessed structure 235c on the plane where the connection surface 234a is located is in a shape of a triangle, and a projection of the recessed structure 235f on the plane where the connection surface 234b is located is in a shape of a triangle.

Each of the recessed structures 235a, 235b and 235c includes a top end portion 2351, a bottom end portion 2353 and a tapered portion 2355 at the connection surface 234a, and each of the recessed structures 235d, 235e and 235f includes a top end portion 2351, a bottom end portion 2353 and a tapered portion 2355 at the connection surface 234b. The top end portions 2351 are respectively located at an edge of the connection surface 234a or the connection surface 234b. In each recessed structure 235a, 235b, 235c, 235d, 235e or 235f, the bottom end portion 2353 is located opposite to the top end portion 2351, and the tapered portion 2355 is connected to and located between the top end portion 2351 and the bottom end portion 2353. Moreover, the tapered portion 2355 has two tapered edges 2356 located on the connection surface 234a or the connection surface 234b. The two tapered edges 2356 are connected to the top end portion 2351 and the bottom end portion 2353, and a width of the tapered portion 2355 decreases in a direction from the top end portion 2351 towards the bottom end portion 2353. Furthermore, each of the recessed structures 235a, 235b, 235c, 235d, 235e and 235f has three inclined surfaces 2357, with two of the three inclined surfaces 2357 respectively extending from the two tapered edges 2356 towards the interior of the light-folding element 23. The three inclined surfaces 2357 respectively extend close to one another from the top end portion 2351 towards the bottom end portion 2353. Additionally, two of the three inclined surfaces 2357 of the recessed structure 235c extend close to each other in directions respectively from the two tapered edges 2356 towards the interior of the light-folding element 23, and two of the three inclined surfaces 2357 of the recessed structure 235f extend close to each other in directions respectively from the two tapered edges 2356 towards the interior of the light-folding element 23.

The recessed structure 235a and the recessed structure 235d are connected to each other, and a groove 2358a is formed between the recessed structure 235a and the recessed structure 235. The groove 2358a is located between the object-side surface 231 and the image-side surface 232. The recessed structure 235b and the recessed structure 235e are connected to each other, and a groove 2358b is formed between the recessed structure 235b and the recessed structure 235e. The groove 2358b is located between the object-side surface 231 and the image-side surface 232. In addition, the recessed structure 235c and the recessed structure 235f are connected to each other, and a groove 2358c is formed between the recessed structure 235c and the recessed structure 235f. The groove 2358c is located between the reflection surface 233a and the reflection surface 233b.

The recessed structures 235a and 235b are disposed opposite to the recessed structure 235c, the tapered portion 2355 of the recessed structure 235a and the tapered portion 2355 of the recessed structure 235c taper in opposite directions, and the tapered portions 2355 of the recessed structure 235b and the tapered portion 2355 of the recessed structure 235c taper in opposite directions. The recessed structures 235d and 235e are disposed opposite to the recessed structure 235f, the tapered portion 2355 of the recessed structure 235d and the tapered portion 2355 of the recessed structure 235f taper in opposite directions, and the tapered portion 2355 of the recessed structure 235e and the tapered portion 2355 of the recessed structure 235f taper in opposite directions.

The light-folding element 23 has a light absorption layer 236 on its surface. As shown in FIG. 17 and FIG. 18, at least a part of the light absorption layer 236 is disposed on the recessed structures 235a, 235b, 235c, 235d, 235e and 235f, and the light absorption layer 236 surrounds the object-side surface 231, the image-side surface 232 and the reflection surfaces 233a and 233b.

In this embodiment, the light-folding element 23 is made of plastic material and formed by injection molding process. The light-folding element 23 has two gate traces 237 respectively located at the connection surfaces 234a and 234b.

When a width of the top end portion 2351 is Wt, and a width of the bottom end portion 2353 is Wb, the following conditions are satisfied for each of the recessed structures 235a, 235b, 235d and 235e: Wt=0.636 mm; Wb=0.1 mm; and Wb/Wt=0.157.

When a width of the top end portion 2351 is Wt, and a width of the bottom end portion 2353 is Wb, the following conditions are satisfied for each of the recessed structures 235c and 235f: Wt=0.433 mm; Wb=0 mm; and Wb/Wt=0.

When an angle between the two tapered edges 2356 of the tapered portion 2355 is α, the following condition is satisfied: α=30 degrees.

When a depth of one of the grooves 2358a and 2358b is Dg, and a distance between the top end portion 2351 and the bottom end portion 2353 of each of the recessed structures 235a, 235b, 235d and 235e is D, the following conditions are satisfied: Dg=0.25 mm; D=1 mm; and Dg/D=0.25.

When a depth of the groove 2358c is Dg, and a distance between the top end portion 2351 and the bottom end portion 2353 of each of the recessed structures 235c and 235f is D, the following conditions are satisfied: Dg=0.25 mm; D=0.804 mm; and Dg/D=0.311.

3rd Embodiment

Figure 19:
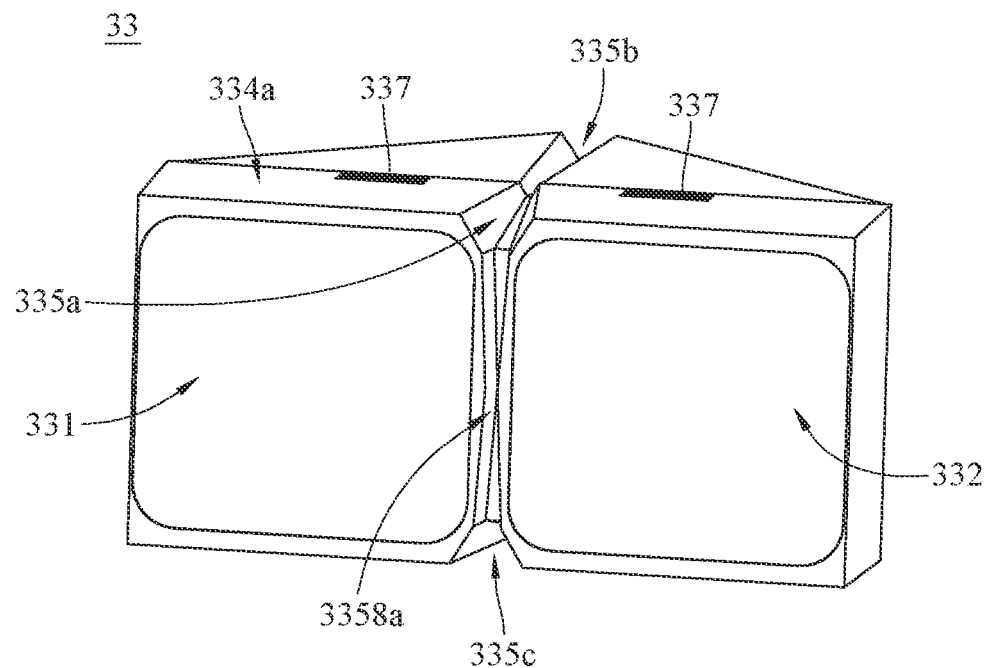
FIG. 19 is a perspective view of a light-folding element according to the 3rd embodiment of the present disclosure.
Figure 20:
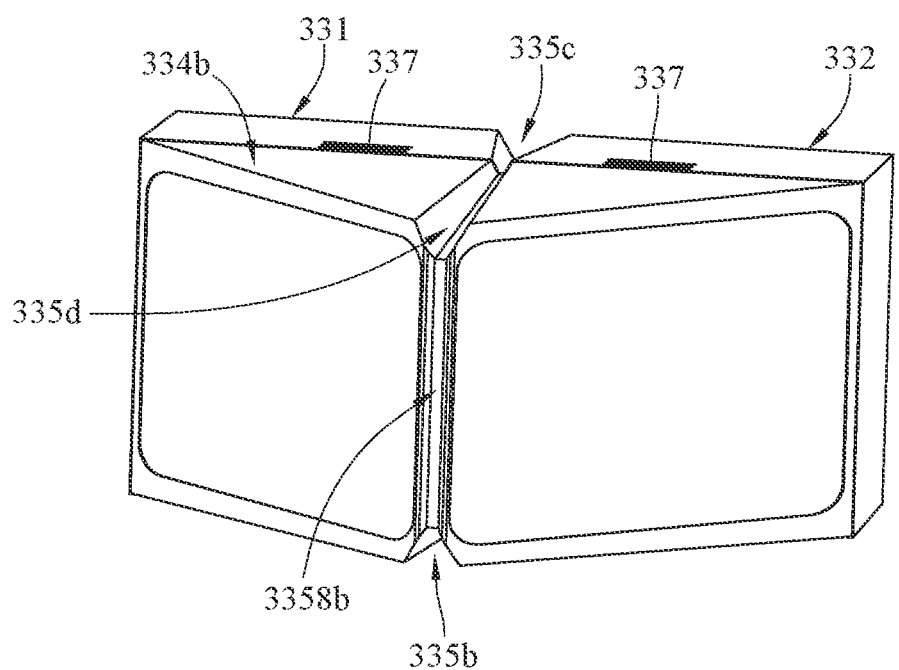
FIG. 20 is another perspective view of the light-folding element in FIG. 1.
Figure 21:
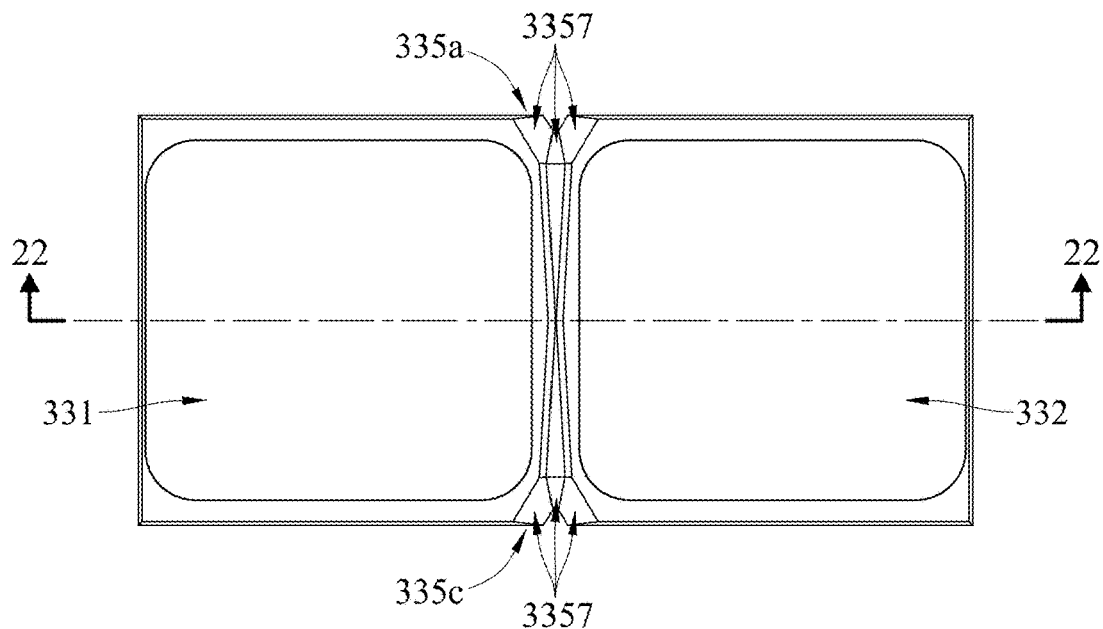
FIG. 21 is a front view of the light-folding element in FIG. 19.
Figure 22:
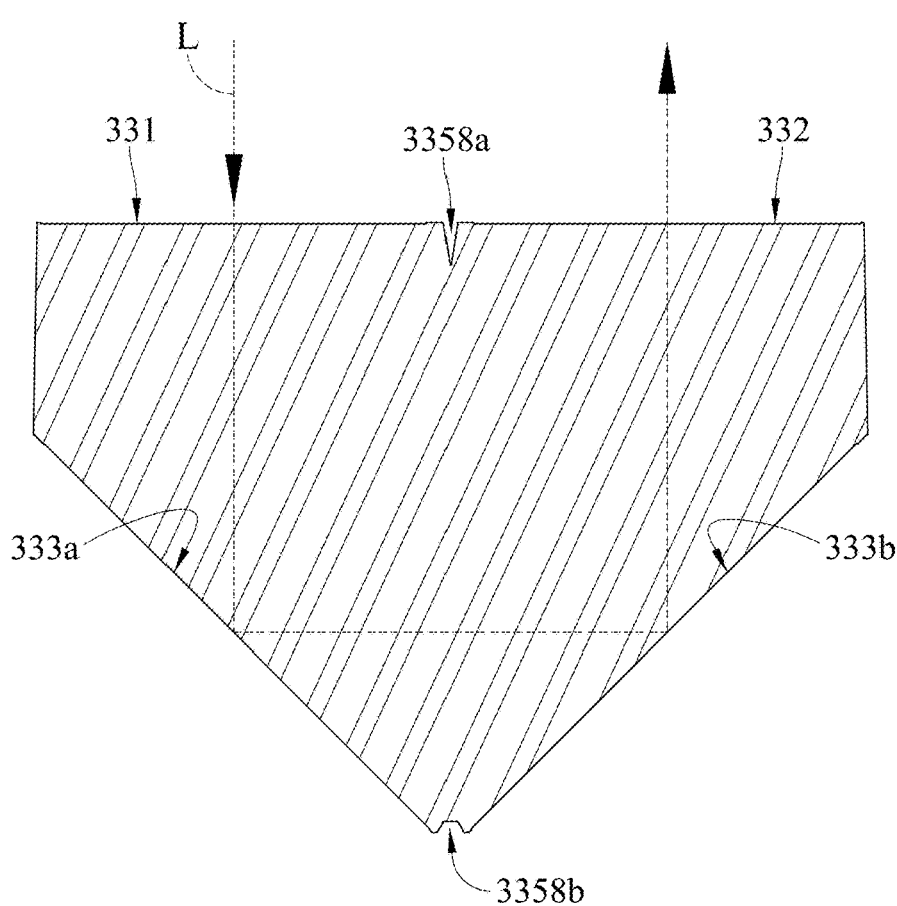
FIG. 22 is a cross-sectional view of the light-folding element along line 22-22 in FIG. 21.
Figure 23:
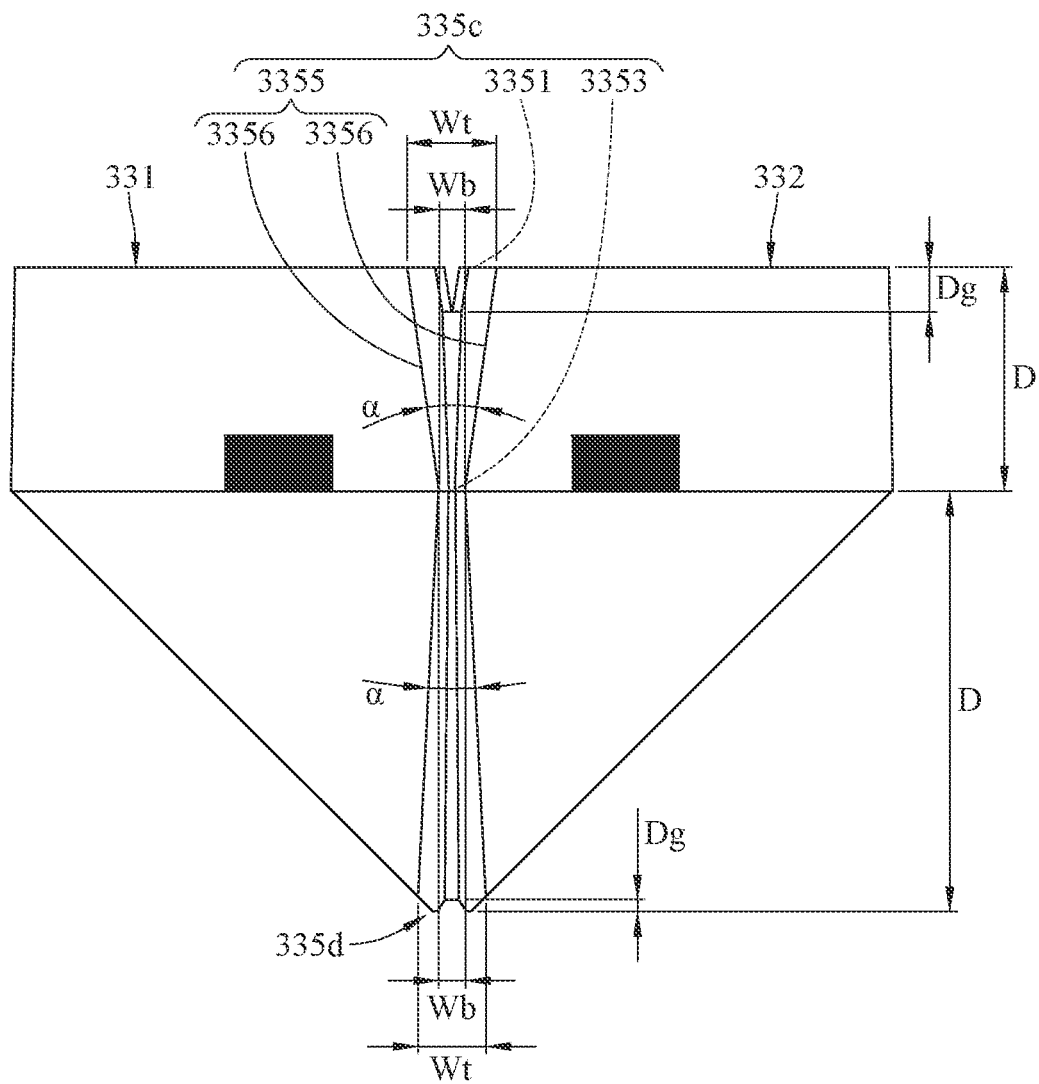
FIG. 23 shows a schematic view of Wt, Wb, a, Dg and D according to the 3rd embodiment of the present disclosure.
Figure 24:
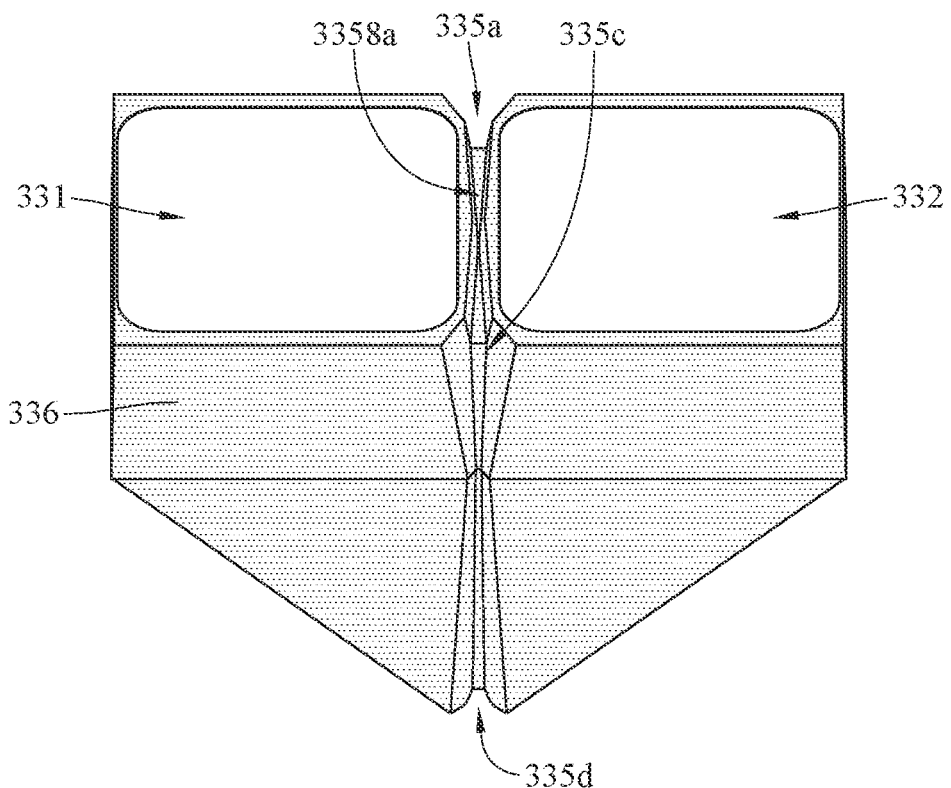
FIG. 24 is a schematic view of a light absorption layer of the light-folding element in FIG. 19.
Figure 25:
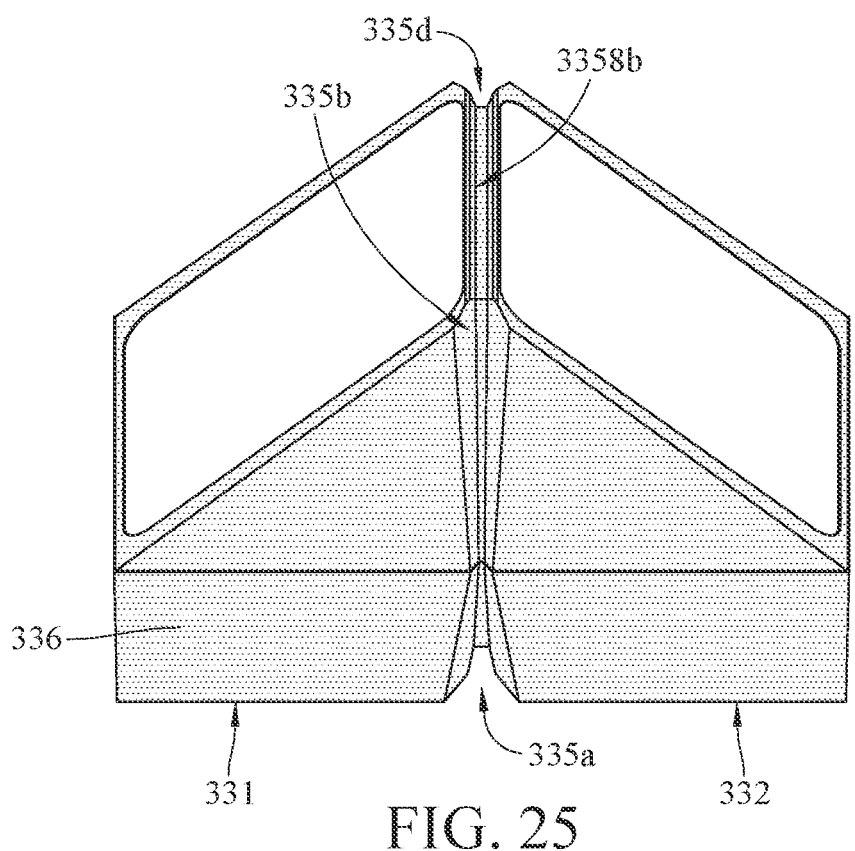
FIG. 25 is a schematic view of the light absorption layer of the light-folding element in FIG. 19.

Please refer to FIG. 19 to FIG. 25. FIG. 19 is a perspective view of a light-folding element according to the 3rd embodiment of the present disclosure, FIG. 20 is another perspective view of the light-folding element in FIG. 1, FIG. 21 is a front view of the light-folding element in FIG. 19, FIG. 22 is a cross-sectional view of the light-folding element along line 22-22 in FIG. 21, FIG. 23 shows a schematic view of Wt, Wb, α, Dg and D according to the 3rd embodiment of the present disclosure, FIG. 24 is a schematic view of a light absorption layer of the light-folding element in FIG. 19, and FIG. 25 is a schematic view of the light absorption layer of the light-folding element in FIG. 19.

In this embodiment, a light-folding element 33 is provided. The light-folding element 33 includes an object-side surface 331, an image-side surface 332, two reflection surfaces 333a and 333b and two connection surfaces 334a and 334b. An imaging light L travelling into a camera module enters the object-side surface 331 and exits through the image-side surface 332. An imaging lens system of the camera module focuses the imaging light L on an image surface. In this embodiment, the imaging light L may pass through the imaging lens system and then pass through the light-folding element 33, or the imaging light L may pass through the light-folding element 33 and then pass through the imaging lens system.

The reflection surfaces 333a and 333b are configured to reflect the imaging light L coming from the object-side surface 331 and send the imaging light L to the image-side surface 332. In addition, the imaging light L passes through, in sequence, the object-side surface 331, the reflection surface 333a, the reflection surface 333b and the image-side surface 332.

The connection surfaces 334a and 334b are connected to the object-side surface 331, the image-side surface 332 and the reflection surfaces 333a and 333b. In addition, the connection surfaces 334a and 334b are disposed opposite to each other; in specific, the connection surfaces 334a and 334b are respectively located on two sides of the object-side surface 331, the image-side surface 332 and the reflection surfaces 333a and 333b.

The light-folding element 33 has four recessed structures 335a, 335b, 335c and 335d. The two recessed structures 335a and 335b are located at the connection surface 334a, and the two recessed structures 335c and 335d are located at the connection surface 334b. Each of the recessed structures 335a, 335b, 335c and 335d is recessed from the connection surface 334a or the connection surface 334b towards an interior of the light-folding element 33. In this embodiment, a projection of each of the recessed structures 335a and 335b on a plane where the connection surface 334a is located is in a shape of a trapezoid, and a projection of each of the recessed structures 335c and 335d on a plane where the connection surface 334b is located is in a shape of a trapezoid.

Each of the recessed structures 335a and 335b includes a top end portion 3351, a bottom end portion 3353 and a tapered portion 3355 at the connection surface 334a, and each of the recessed structures 335c and 335d includes a top end portion 3351, a bottom end portion 3353 and a tapered portion 3355 at the connection surface 334b. The top end portions 3351 are respectively located at an edge of the connection surface 334a or the connection surface 334b. In each recessed structure 335a, 335b, 335c or 335d, the bottom end portion 3353 is located opposite to the top end portion 3351, and the tapered portion 3355 is connected to and located between the top end portion 3351 and the bottom end portion 3353. Moreover, the tapered portion 3355 has two tapered edges 3356 located on the connection surface 334a or the connection surface 334b. The two tapered edges 3356 are connected to the top end portion 3351 and the bottom end portion 3353, and a width of the tapered portion 3355 decreases in a direction from the top end portion 3351 towards the bottom end portion 3353. Furthermore, each of the recessed structures 335a, 335b, 335c and 335d has three inclined surfaces 3357, with two of the three inclined surfaces 3357 respectively extending close to each other from the two tapered edges 3356 towards the interior of the light-folding element 33. The three inclined surfaces 3357 respectively extend close to one another from the top end portion 3351 towards the bottom end portion 3353.

The recessed structure 335a and the recessed structure 335c are connected to each other, and a groove 3358a is formed between the recessed structure 335a and the recessed structure 335c. The groove 3358a is located between the object-side surface 331 and the image-side surface 332. In addition, the recessed structure 335b and the recessed structure 335d are connected to each other, and a groove 3358b is formed between the recessed structure 335b and the recessed structure 335d. The groove 3358b is located between the reflection surface 333a and the reflection surface 333b.

The recessed structure 335a and the recessed structure 335b are disposed opposite to each other, and the tapered portion 3355 of the recessed structure 335a and the tapered portion 3355 of the recessed structure 335b are connected to each other and taper in opposite directions. The recessed structure 335c and the recessed structure 335d are disposed opposite to each other, and the tapered portion 3355 of the recessed structure 335c and the tapered portion 3355 of the recessed structure 335d are connected to each other and taper in opposite directions.

The light-folding element 33 has a light absorption layer 336 on its surface. As shown in FIG. 24 and FIG. 25, at least a part of the light absorption layer 336 is disposed on the recessed structures 335a, 335b, 335c and 335d, and the light absorption layer 336 surrounds the object-side surface 331, the image-side surface 332 and the reflection surfaces 333a and 333b.

In this embodiment, the light-folding element 33 is made of plastic material and formed by injection molding process. The light-folding element 33 has four gate traces 337. Two of the gate traces 337 are located at the connection surface 334a, and the other two of the gate traces 337 are located at the connection surface 334b.

When a width of the top end portion 3351 is Wt, and a width of the bottom end portion 3353 is Wb, the following conditions are satisfied for each of the recessed structures 335a and 335c: Wt=0.8 mm; Wb=0.288 mm; and Wb/Wt=0.36.

When a width of the top end portion 3351 is Wt, and a width of the bottom end portion 3353 is Wb, the following conditions are satisfied for each of the recessed structures 335b and 335d: Wt=0.606 mm; Wb=0.239 mm; and Wb/Wt=0.394.

When an angle between the two tapered edges 3356 of each of the recessed structures 335a and 335c is α, the following condition is satisfied: α=16 degrees.

When an angle between the two tapered edges 3356 of each of the recessed structures 335b and 335d is α, the following condition is satisfied: α=6 degrees.

When a depth of the groove 3358a is Dg, and a distance between the top end portion 3351 and the bottom end portion 3353 of each of the recessed structures 335a and 335c is D, the following conditions are satisfied: Dg=0.4 mm; D=2 mm; and Dg/D=0.2.

When a depth of the groove 3358b is Dg, and a distance between the top end portion 3351 and the bottom end portion 3353 of each of the recessed structures 335b and 335d is D, the following conditions are satisfied: Dg=0.105 mm; D=3.622 mm; and Dg/D=0.029.

4th Embodiment

Figure 26:
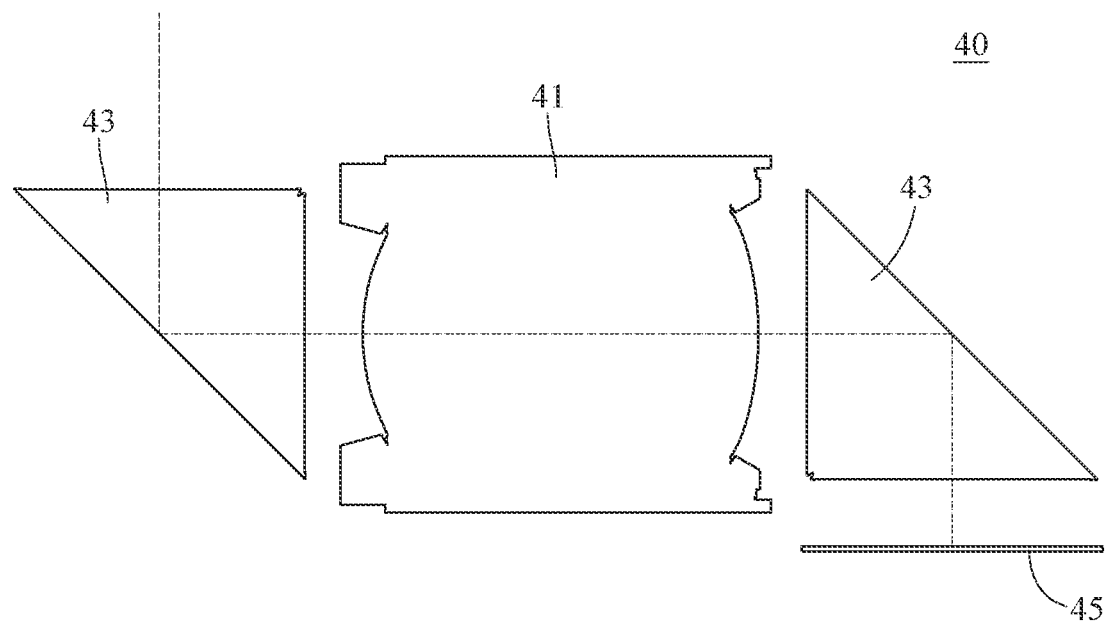
FIG. 26 is a schematic view of a camera module according to the 4th embodiment of the present disclosure.
Figure 27:
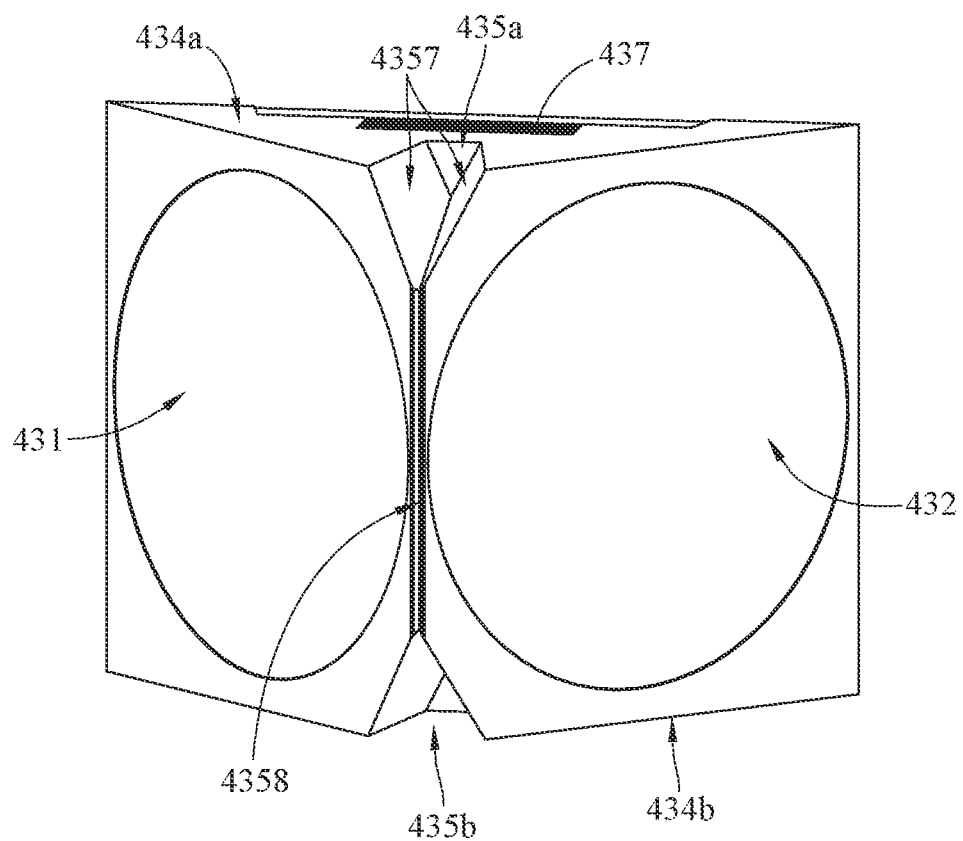
FIG. 27 is a perspective view of the light-folding element of the camera module in FIG. 26.
Figure 28:
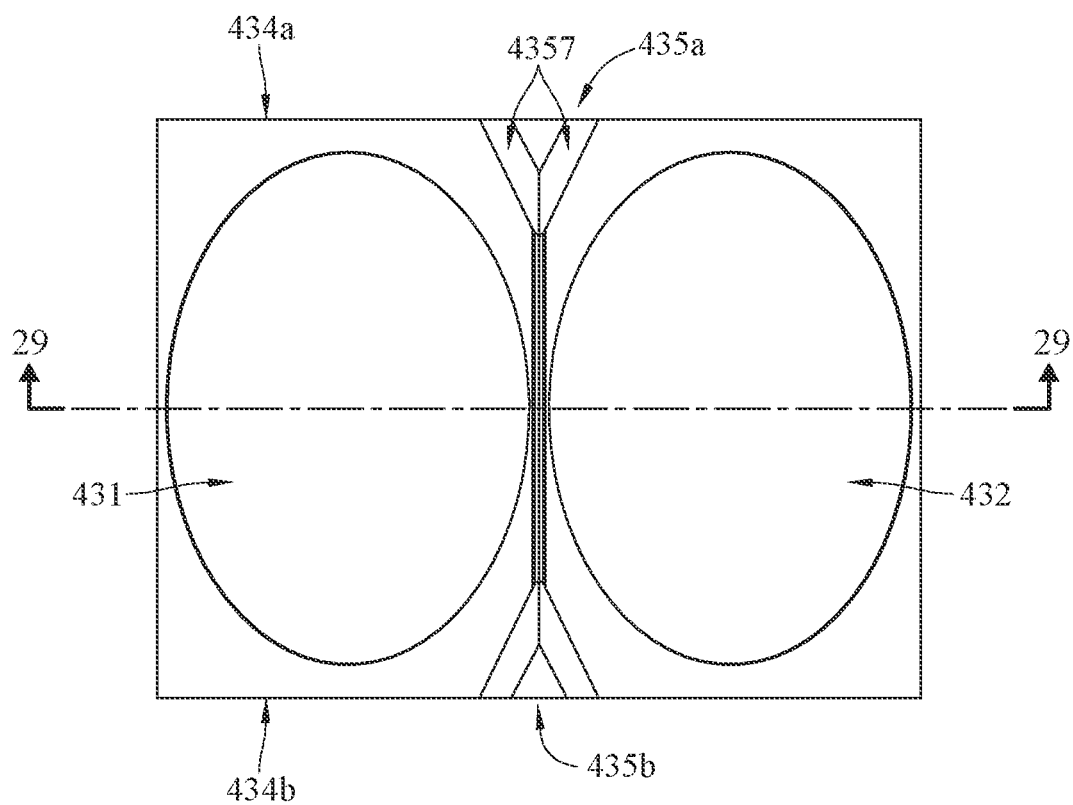
FIG. 28 is a front view of the light-folding element of the camera module in FIG. 27.
Figure 29:
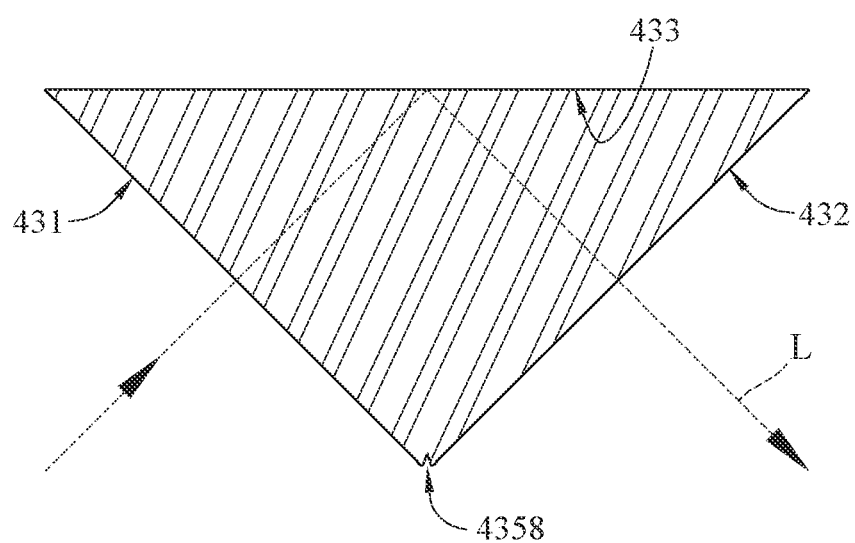
FIG. 29 is a cross-sectional view of the light-folding element along line 29-29 in FIG. 28.
Figure 30:
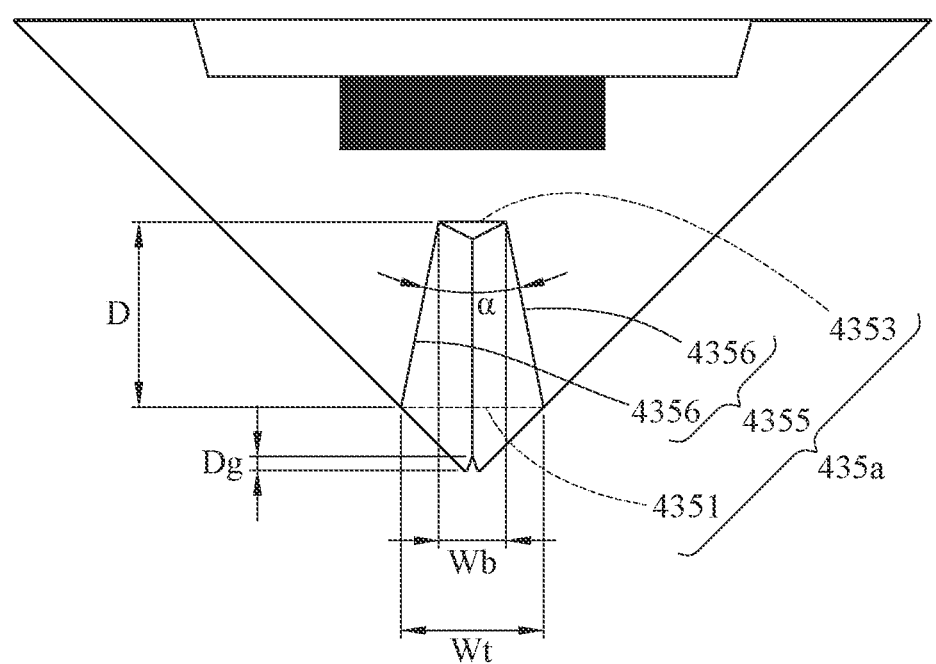
FIG. 30 is a schematic view of Wt, Wb, a, Dg and D according to the 4th embodiment of the present disclosure.
Figure 31:
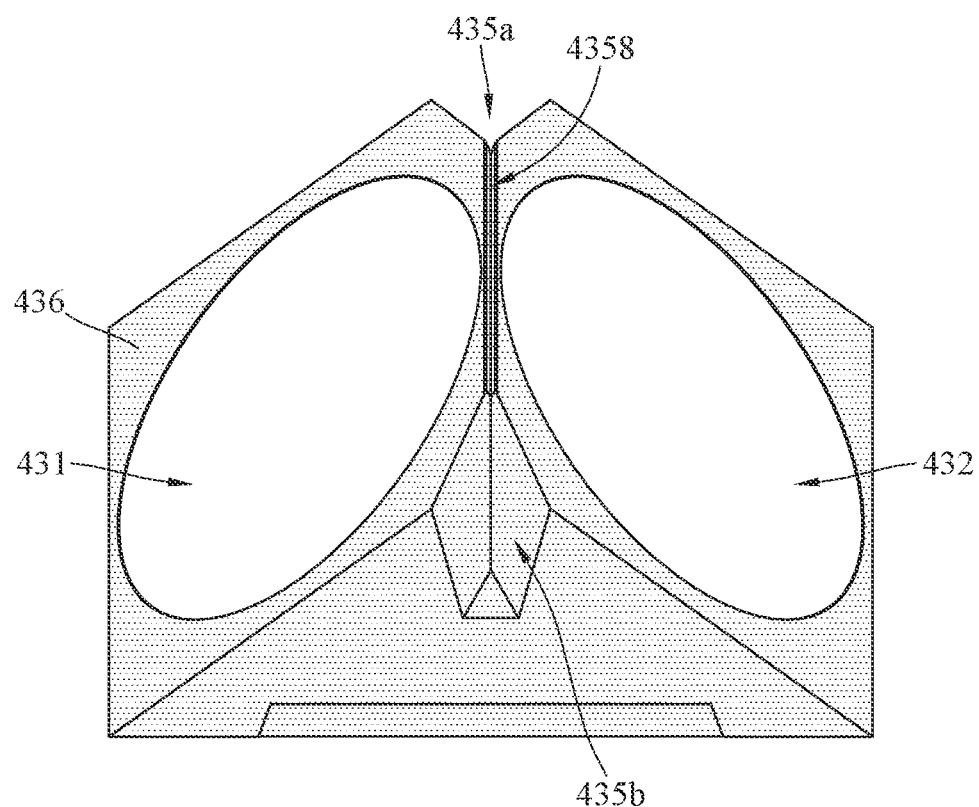
FIG. 31 is a schematic view of a light absorption layer of the light-folding element of the camera module in FIG. 26.
Figure 32:
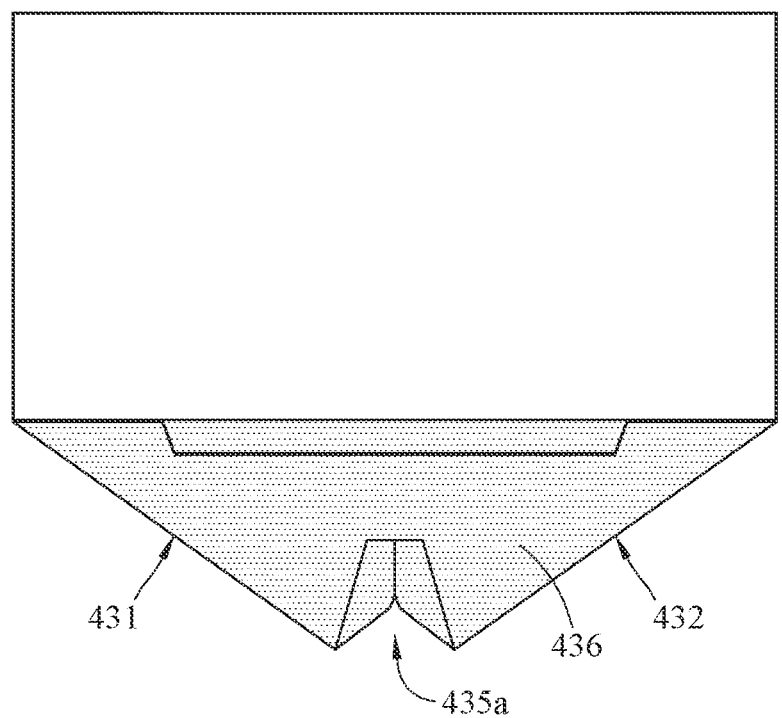
FIG. 32 is another schematic view of the light absorption layer of the light-folding element and the camera module in FIG. 26.

Please refer to FIG. 26 to FIG. 32. FIG. 26 is a schematic view of a camera module according to the 4th embodiment of the present disclosure, FIG. 27 is a perspective view of the light-folding element of the camera module in FIG. 26, FIG. 28 is a front view of the light-folding element of the camera module in FIG. 27, FIG. 29 is a cross-sectional view of the light-folding element along line 29-29 in FIG. 28, FIG. 30 is a schematic view of Wt, Wb, a, Dg and D according to the 4th embodiment of the present disclosure, FIG. 31 is a schematic view of a light absorption layer of the light-folding element of the camera module in FIG. 26, and FIG. 32 is another schematic view of the light absorption layer of the light-folding element and the camera module in FIG. 26.

In this embodiment, a camera module 40 is provided. The camera module 40 includes an imaging lens system 41, two light-folding elements 43 and an image sensor 45. The two light-folding elements 43 has the same configuration and are respectively located on an object side and an image side of the imaging lens system 41. The image sensor 45 is disposed on an image surface of the imaging lens system 41. In addition, the light-folding element 43 located on the object side of the imaging lens system 41 is configured to change the travelling direction of an imaging light L in the camera module 40 so that the imaging light L can enter the imaging lens system 41, and the light-folding element 43 located on the image side of the imaging lens system 41 is configured to change the travelling direction of the imaging light L coming from the imaging lens system 41 so that the imaging light L travels towards the image sensor 45. The image sensor 45 is configured to receive the imaging light L and convert the imaging light L into electrical signals.

Each of the light-folding elements 43 includes an object-side surface 431, an image-side surface 432, a reflection surface 433 and two connection surfaces 434a, 434b. The imaging light L enters the object-side surface 431, and exits through the image-side surface 432. The imaging lens system 41 focuses the imaging light L on an image surface. In this embodiment, the imaging light L pass through, in sequence, one of the light-folding elements 43, the imaging lens system 41 and the other of the light-folding elements 43.

The reflection surface 433 is configured to reflect the imaging light L coming from the object-side surface 431 and send the imaging light L to the image-side surface 432. In addition, the imaging light L passes through, in sequence, the object-side surface 431, the reflection surface 433 and the image-side surface 432.

The connection surfaces 434a and 434b are connected to the object-side surface 431, the image-side surface 432 and the reflection surface 433. In addition, the connection surfaces 434a and 434b are disposed opposite to each other; in specific, the connection surfaces 434a and 434b are respectively located on two sides of the object-side surface 431, the image-side surface 432 and the reflection surface 433.

Each of the light-folding elements 43 has two recessed structures 435a and 435b. The recessed structure 435a is located at the connection surface 434a, and the recessed structure 435b is located at the connection surface 434b. Each of the recessed structures 435a and 435b is recessed from the connection surface 434a or the connection surface 434b towards an interior of the light-folding elements 43. In this embodiment, a projection of the recessed structure 435a on a plane where the connection surface 434a is located is in a shape of a trapezoid, and a projection of the recessed structure 435b on a plane where the connection surface 434b is located is in a shape of a trapezoid.

The recessed structure 435a includes a top end portion 4351, a bottom end portion 4353 and a tapered portion 4355 at the connection surface 434a, and the recessed structure 435b includes a top end portion 4351, a bottom end portion 4353 and a tapered portion 4355 at the connection surface 434b. The top end portion 4351 are respectively located at an edge of the connection surface 434a or the connection surface 434b. In each recessed structure 435a or 435b, the bottom end portion 4353 is located opposite to the top end portion 4351, and the tapered portion 4355 is connected to and located between the top end portion 4351 and the bottom end portion 4353. Moreover, the tapered portion 4355 has two tapered edges 4356 located on the connection surface 434a or the connection surface 434b, the tapered edges 4356 are connected to the top end portion 4351 and the bottom end portion 4353, and a width of the tapered portion 4355 decreases in a direction from the top end portion 4351 towards the bottom end portion 4353. Furthermore, each of the recessed structures 435a and 435b has two inclined surfaces 4357 respectively extending close to each other from the two tapered edges 4356 towards the interior of the light-folding elements 43.

The recessed structure 435a and the recessed structure 435b are connected to each other, and a groove 4358 is formed between the recessed structure 435a and the recessed structure 435b. The groove 4358 is located between the object-side surface 431 and the image-side surface 432.

The light-folding elements 43 has a light absorption layer 436. As shown in FIG. 31 and FIG. 32, at least a part of the light absorption layer 436 is disposed on the recessed structures 435a and 435b, and the light absorption layer 436 surrounds the object-side surface 431 and the image-side surface 432.

In this embodiment, the light-folding elements 43 are made of plastic material and formed by injection molding process. Each of the light-folding elements 43 has a gate trace 437 located at the connection surface 434a.

When a width of the top end portion 4351 is Wt, and a width of the bottom end portion 4353 is Wb, the following conditions are satisfied for each of the recessed structures 435a and 435b: Wt=1.271 mm; Wb=0.597 mm; and Wb/Wt=0.470.

When an angle between the two tapered edges 4356 of the tapered portion 4355 is α, the following condition is satisfied: α=23 degrees.

When a depth of the groove 4358 is Dg, and a distance between the top end portion 4351 and the bottom end portion 4353 of each of the recessed structures 435a and 435b is D, the following conditions are satisfied: Dg=0.129 mm; D=1.654 mm; and Dg/D=0.078.

5th Embodiment

Figure 33:
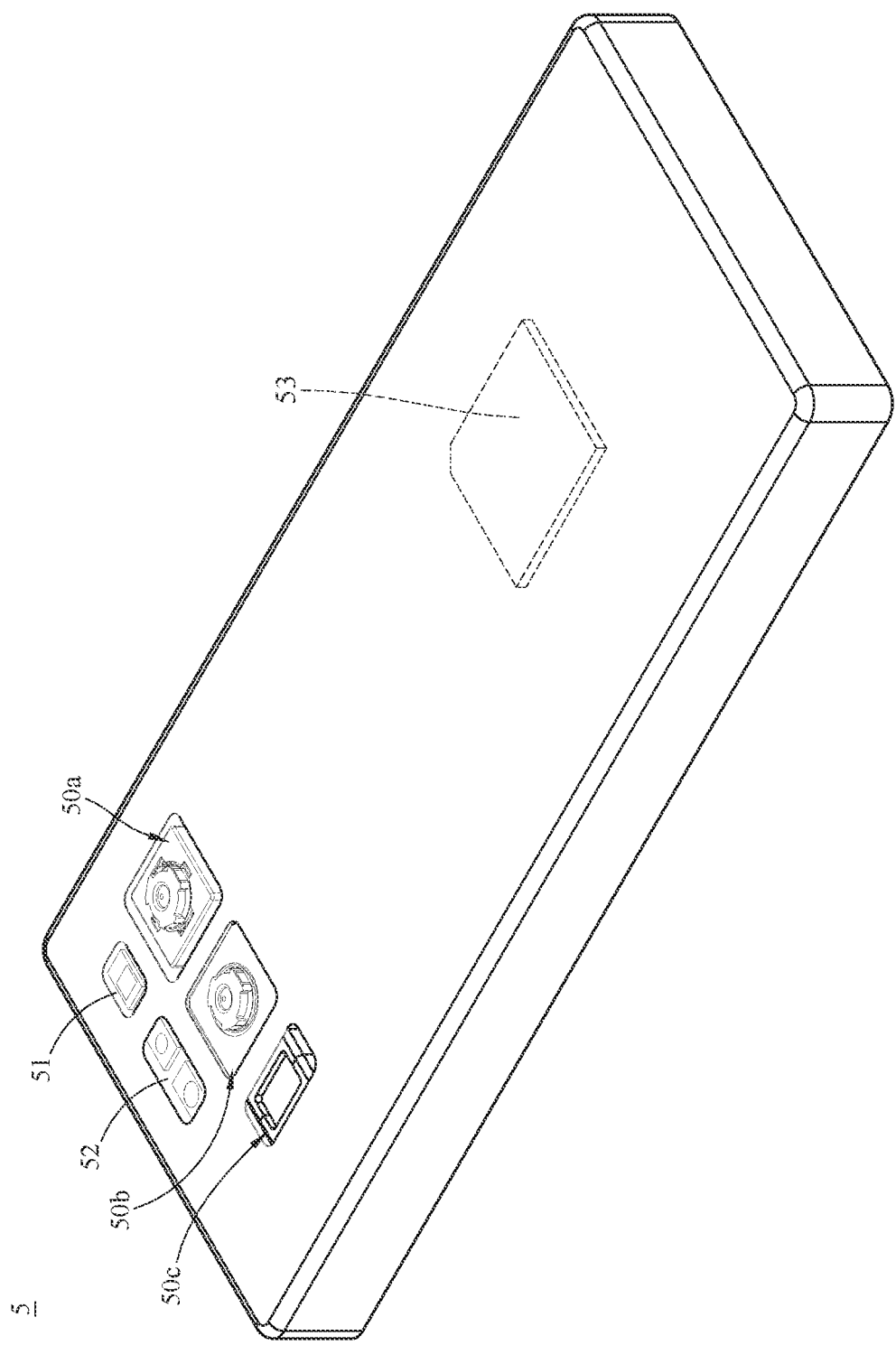
FIG. 33 is one perspective view of an electronic device according to the 5th embodiment of the present disclosure.
Figure 34:
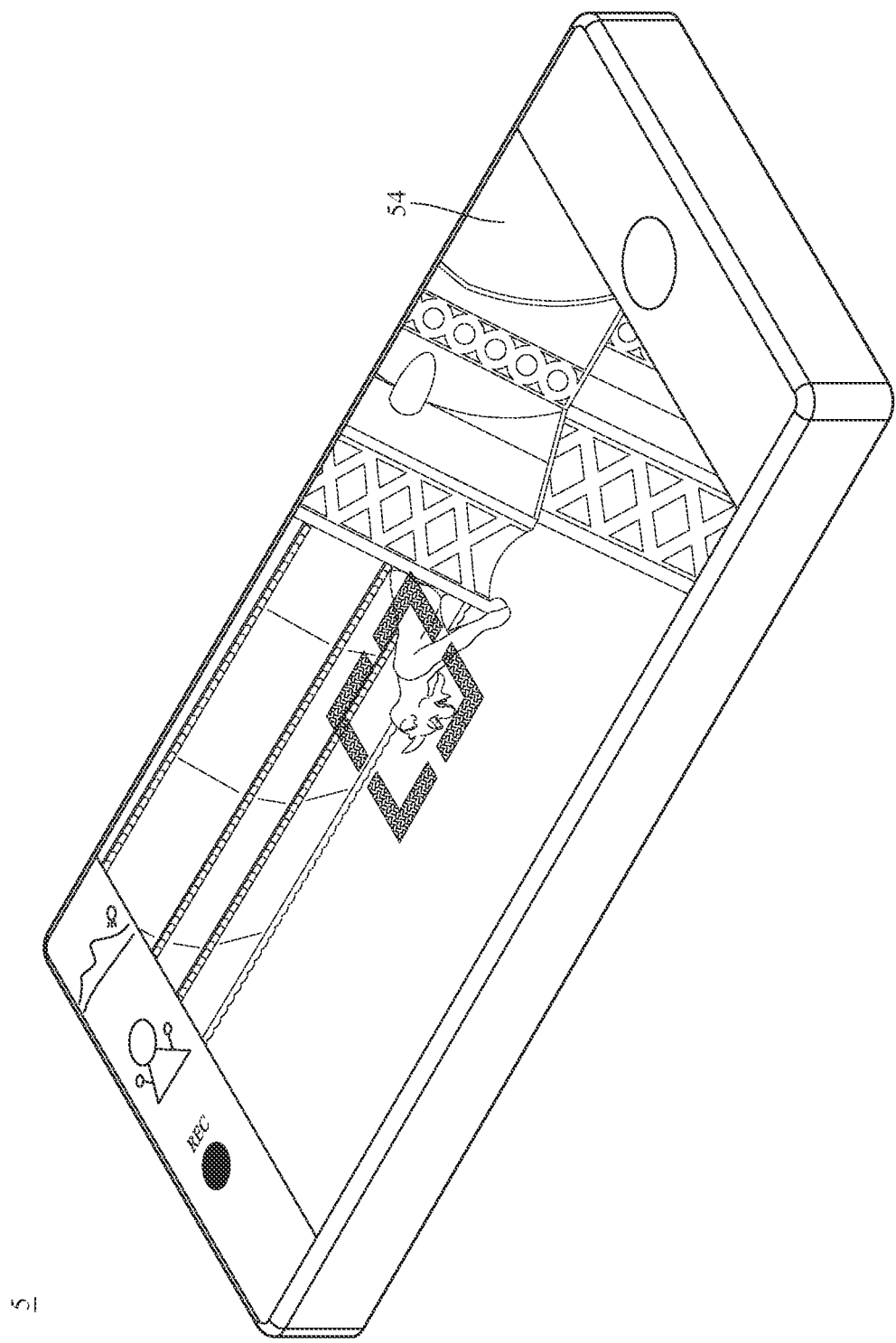
FIG. 34 is another perspective view of the electronic device in FIG. 33.

Please refer to FIG. 33 and FIG. 34. FIG. 33 is one perspective view of an electronic device according to the 5th embodiment of the present disclosure, and FIG. 34 is another perspective view of the electronic device in FIG. 33.

In this embodiment, an electronic device 5 is a smartphone including a plurality of camera modules, a flash module 51, a focus assist module 52, an image signal processor 53, a display module (user interface) 54 and an image software processor (not shown).

The camera modules include an ultra-wide-angle camera module 50a, a high pixel camera module 50b and a telephoto camera module 50c. The camera module disclosed in the 1st embodiment is taken as the telephoto camera module 50c, but the present disclosure is not limited thereto. Camera modules including a light-folding element disclosed in other embodiments can also be taken as the telephoto camera module 50c.

Figure 35:
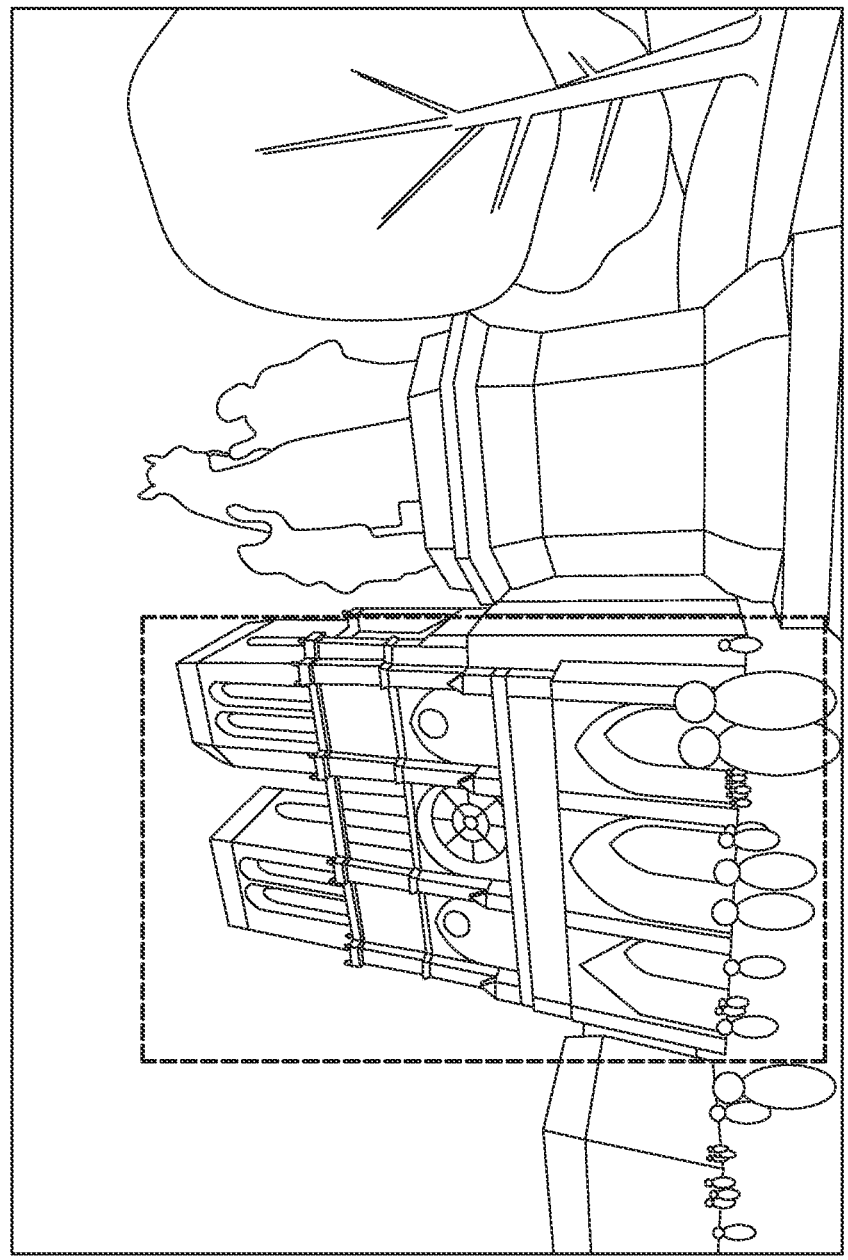
FIG. 35 is an image captured by an ultra-wide-angle camera module.

The image captured by the ultra-wide-angle camera module 50a enjoys a feature of multiple imaged objects. FIG. 35 is an image captured by the ultra-wide-angle camera module 50a.

Figure 36:
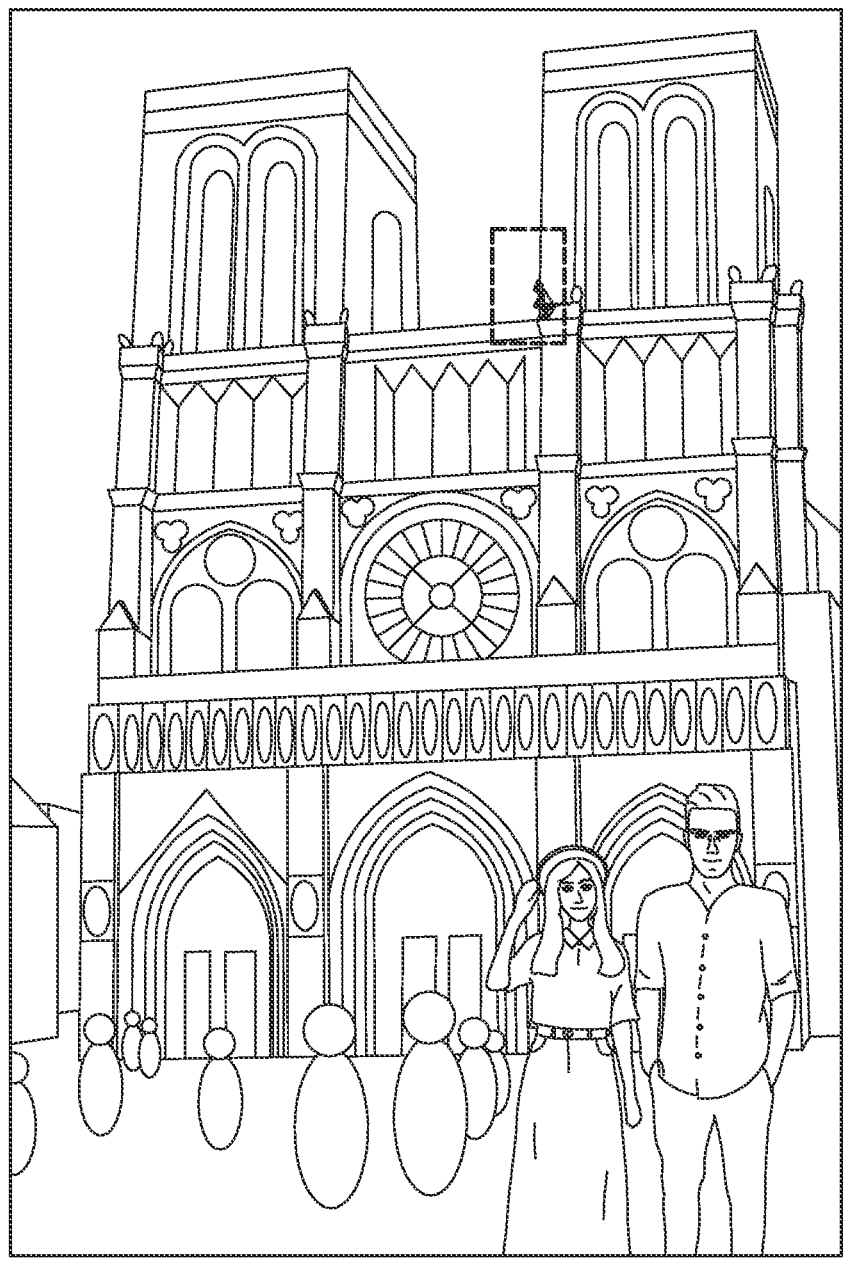
FIG. 36 is an image captured by a high pixel camera module.

The image captured by the high pixel camera module 50b enjoys a feature of high resolution and less distortion, and the high pixel camera module 50b can capture part of the image in FIG. 35. FIG. 36 is an image captured by the high pixel camera module 50b.

Figure 37:
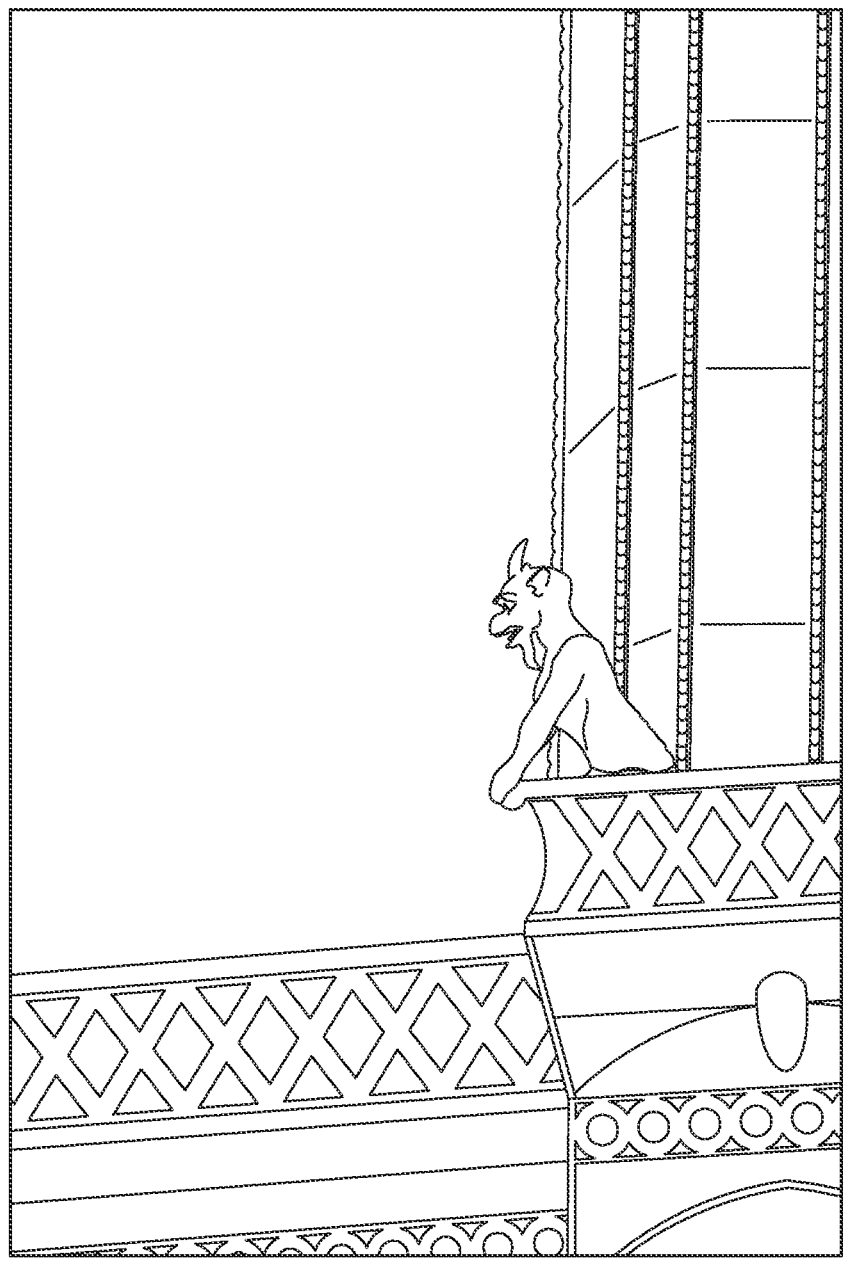
FIG. 37 is an image captured by a telephoto camera module.

The image captured by the telephoto camera module 50c enjoys a feature of high optical magnification, and the telephoto camera module 50c can capture part of the image in FIG. 36. FIG. 37 is an image captured by the telephoto camera module 50c. The maximum field of view (FOV) of the camera module corresponds to the field of view in FIG. 37.

When a user captures images of an object, the light rays converge in the ultra-wide-angle camera module 50a, the high pixel camera module 50b or the telephoto camera module 50c to generate images, and the flash module 51 is activated for light supplement. The focus assist module 52 detects the object distance of the imaged object to achieve fast auto focusing. The image signal processor 53 is configured to optimize the captured image to improve image quality and provided zooming function. The light beam emitted from the focus assist module 52 can be either conventional infrared or laser. The display module 54 can include a touch screen, and the user is able to interact with the display module 54 and the image software processor having multiple functions to capture images and complete image processing. Alternatively, the user may capture images via a physical button. The image processed by the image software processor can be displayed on the display module 54.

6th Embodiment

Figure 38:
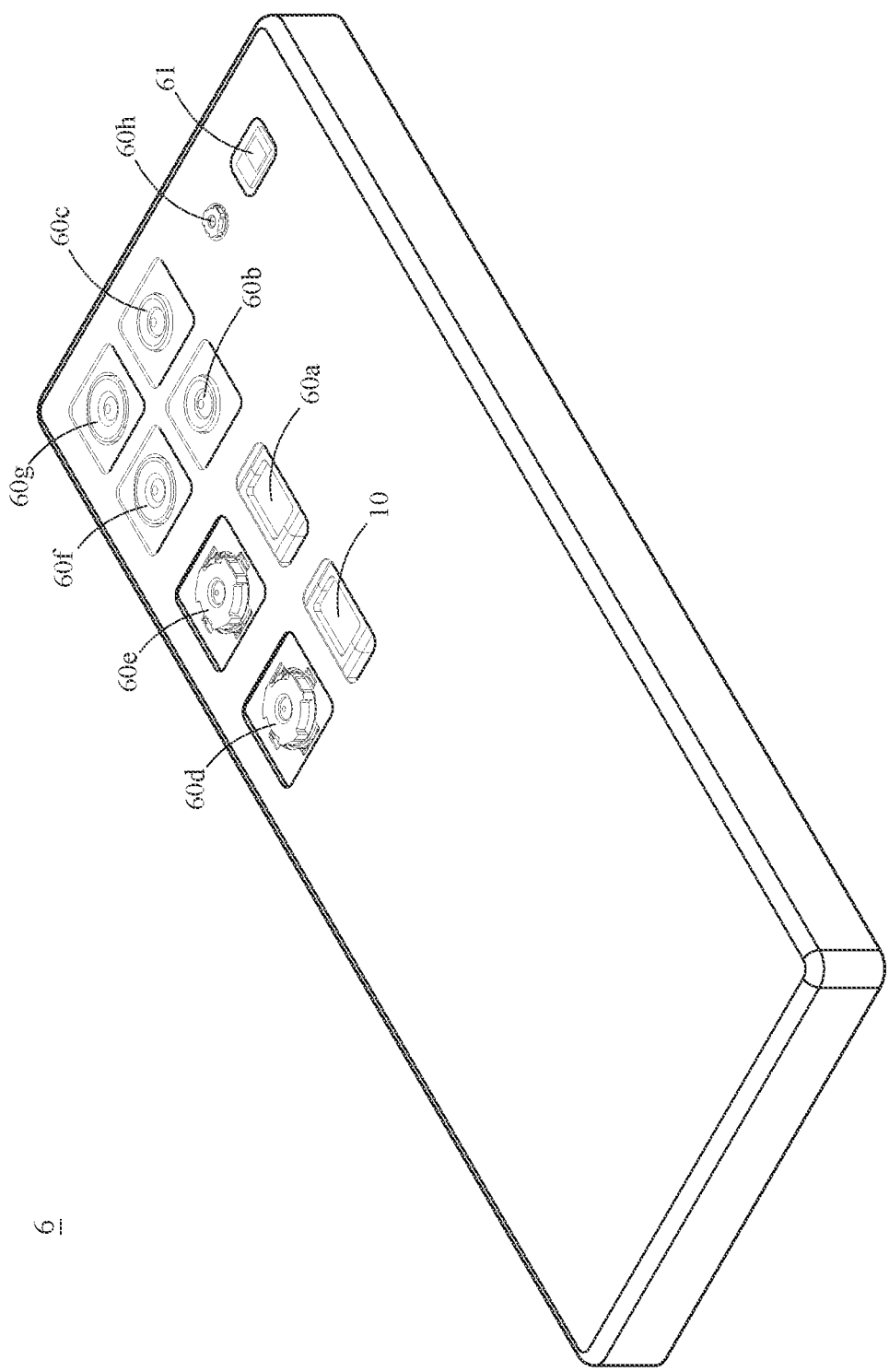
FIG. 38 is one perspective view of an electronic device according to the 6th embodiment of the present disclosure.

Please refer to FIG. 38, which is one perspective view of an electronic device according to the 6th embodiment of the present disclosure.

In this embodiment, an electronic device 6 is a smartphone including the camera module 10 disclosed in the 1st embodiment, a camera module 60a, a camera module 60b, a camera module 60c, a camera module 60d, a camera module 60e, a camera module 60f, a camera module 60g, a camera module 60h, a flash module 61, an image signal processor, a display module and an image software processor (not shown). The camera module 10, the camera module 60a, the camera module 60b, the camera module 60c, the camera module 60d, the camera module 60e, the camera module 60f, the camera module 60g and the camera module 60h are disposed on the same side of the electronic device 6, while the display module is disposed on the opposite side of the electronic device 6.

The camera module 10 is a telephoto camera module, the camera module 60a is a telephoto camera module, the camera module 60b is a telephoto camera module, the camera module 60c is a telephoto camera module, the camera module 60d is a wide-angle camera module, the camera module 60e is a wide-angle camera module, the camera module 60f is an ultra-wide-angle camera module, the camera module 60g is an ultra-wide-angle camera module, and the camera module 60h is a ToF (time of flight) camera module. In this embodiment, the camera module 10, the camera module 60a, the camera module 60b, the camera module 60c, the camera module 60d, the camera module 60e, the camera module 60f and the camera module 60g have different fields of view, such that the electronic device 6 can have various magnification ratios so as to meet the requirement of optical zoom functionality. In addition, the camera module 10 and the camera module 60a are telephoto camera modules having a light-folding element configuration. In addition, the camera module 60h can determine depth information of the imaged object. In this embodiment, the electronic device 6 includes a plurality of camera modules 10, 60a, 60b, 60c, 60d, 60e, 60f, 60g, and 60h, but the present disclosure is not limited to the number and arrangement of camera module. When a user captures images of an object, the light rays converge in the camera modules 10, 60a, 60b, 60c, 60d, 60e, 60f, 60g or 60h to generate an image(s), and the flash module 61 is activated for light supplement. Further, the subsequent processes are performed in a manner similar to the abovementioned embodiments, so the details in this regard will not be provided again.

The smartphones in the embodiments are only exemplary for showing the camera module and the light-folding element for the camera module of the present disclosure installed in an electronic device, and the present disclosure is not limited thereto. The camera module and the light-folding element for the camera module can be optionally applied to optical systems with a movable focus. Furthermore, the camera module and the light-folding element for the camera module feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A light-folding element for a camera module, the light-folding element comprising:
   an object-side surface, wherein an imaging light travelling into the camera module enters the object-side surface;
   an image-side surface, wherein the imaging light exits through the image-side surface; and
   a reflection surface, configured to reflect the imaging light;
   wherein the light-folding element further comprises a recessed structure adjacent to at least one of the object-side surface, the image-side surface and the reflection surface, and the recessed structure comprises a top end portion, a bottom end portion and a tapered portion;
   wherein the top end portion is located at an edge of the light-folding element, the bottom end portion is located opposite to the top end portion, the tapered portion is connected to and located between the top end portion and the bottom end portion, and a width of the tapered portion decreases in a direction from the top end portion towards the bottom end portion;
   wherein the light-folding element is formed by injection molding process, and the light-folding element has at least one gate trace located on a side surface of the light-folding element; and
   wherein the recessed structure has three inclined surfaces respectively extending close to one another from the top end portion towards the bottom end portion.

2. The light-folding element for the camera module of claim 1, wherein the tapered portion comprises two tapered edges disposed on the side surface of the light-folding element; and
   wherein an angle between the two tapered edges is a, and the following condition is satisfied:

$$2 \text{ degrees} \leq \alpha \leq 150 \text{ degrees}.$$

3. The light-folding element for the camera module of claim 1, wherein a width of the top end portion is Wt, a width of the bottom end portion is Wb, and the following condition is satisfied:

$$0 \leq Wb/Wt < 1.$$

4. The light-folding element for the camera module of claim 1, wherein the light-folding element has a light absorption layer, and at least a part of the light absorption layer is disposed on the recessed structure.

5. The light-folding element for the camera module of claim 4, wherein the light absorption layer surrounds at least one of the object-side surface, the image-side surface and the reflection surface.

6. A light-folding element for a camera module, the light-folding element comprising:
   an object-side surface, wherein an imaging light travelling into the camera module enters the object-side surface;
   an image-side surface, wherein the imaging light exits through the image-side surface; and
   at least one reflection surface, configured to reflect the imaging light;
   wherein the light-folding element further comprises at least one recessed structure adjacent to at least one of the object-side surface, the image-side surface and the at least one reflection surface, and the at least one recessed structure comprises a top end portion, a bottom end portion and a tapered portion;
   wherein the top end portion is located at an edge of the light-folding element, the bottom end portion is located opposite to the top end portion, the tapered portion is connected to and located between the top end portion and the bottom end portion, and a width of the tapered portion decreases in a direction from the top end portion towards the bottom end portion;
   wherein the at least one recessed structure has three inclined surfaces respectively extending close to one another from the top end portion towards the bottom end portion; and
   wherein a width of the top end portion is Wt, a width of the bottom end portion is Wb, and the following condition is satisfied:

$$0 \leq Wb/Wt < 1.$$

7. The light-folding element for the camera module of claim 6, wherein the width of the top end portion is Wt, the width of the bottom end portion is Wb, and the following condition is satisfied:

$$0.157 \leq Wb/Wt < 1.$$

8. The light-folding element for the camera module of claim 7, wherein the width of the top end portion is Wt, the width of the bottom end portion is Wb, and the following condition is satisfied:

$$0.157 \leq Wb/Wt \leq 0.470.$$

9. The light-folding element for the camera module of claim 6, wherein the at least one recessed structure comprises two recessed structures, the two recessed structures are disposed opposite to each other, and a direction from the top end portion towards the bottom end portion of one of the two recessed structures is opposite to a direction from the top end portion towards the bottom end portion of other of the two recessed structures.

10. The light-folding element for the camera module of claim 6, wherein the at least one reflection surface comprises at least two reflection surfaces.

11. The light-folding element for the camera module of claim 6, wherein the light-folding element has a light absorption layer, and at least a part of the light absorption layer is disposed on the at least one recessed structure.

12. The light-folding element for the camera module of claim 11, wherein the light absorption layer surrounds at least one of the object-side surface, the image-side surface and the at least one reflection surface.

13. A camera module, comprising:
an imaging lens system;
the light-folding element of claim 6, wherein the light-folding element is located on one of an object side of the imaging lens system and an image side of the imaging lens system; and
an image sensor, disposed on an image surface of the imaging lens system, wherein the image sensor is configured to receive the imaging light and convert the imaging light into electrical signals.

14. An electronic device, comprising:
the camera module of claim 13.

15. A light-folding element for a camera module, the light-folding element comprising:
an object-side surface, wherein an imaging light travelling into the camera module enters the object-side surface;
an image-side surface, wherein the imaging light exits through the image-side surface; and
a reflection surface, configured to reflect the imaging light;
wherein the light-folding element further comprises two recessed structures adjacent to the object-side surface and the image-side surface respectively, and each of the two recessed structures comprises a top end portion, a bottom end portion and a tapered portion;
wherein in each of the two recessed structures, the top end portion is located at an edge of the light-folding element, the bottom end portion is located opposite to the top end portion, the tapered portion is connected to and located between the top end portion and the bottom end portion, and a width of the tapered portion decreases in a direction from the top end portion towards the bottom end portion;
wherein a direction from the top end portion towards the bottom end portion of one of the two recessed structures is opposite to a direction from the top end portion towards the bottom end portion of other of the two recessed structures; and
wherein each of the two recessed structures has three inclined surfaces respectively extending close to one another from the top end portion towards the bottom end portion.

* * * * *